(12) United States Patent
Okuyama et al.

(10) Patent No.: US 11,820,194 B2
(45) Date of Patent: Nov. 21, 2023

(54) VEHICLE SUSPENSION SYSTEM

(71) Applicant: MAZDA MOTOR CORPORATION, Hiroshima (JP)

(72) Inventors: Kazuhiro Okuyama, Aki-gun (JP); Masaya Hiramatsu, Aki-gun (JP); Yoshitada Toyoshima, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/814,319

(22) Filed: Jul. 22, 2022

(65) Prior Publication Data

US 2023/0038448 A1 Feb. 9, 2023

(30) Foreign Application Priority Data

Aug. 5, 2021 (JP) .................. 2021-129035

(51) Int. Cl.
| | |
|---|---|
| *B60G 3/22* | (2006.01) |
| *B60G 3/26* | (2006.01) |
| *B60G 7/00* | (2006.01) |

(52) U.S. Cl.
CPC .............. *B60G 3/26* (2013.01); *B60G 3/225* (2013.01); *B60G 7/001* (2013.01);
(Continued)

(58) Field of Classification Search
CPC . B60G 3/06; B60G 3/20; B60G 3/225; B60G 3/26; B60G 7/001; B60G 7/005;
(Continued)

(56) References Cited

U.S. PATENT DOCUMENTS

| | | | | |
|---|---|---|---|---|
| 8,444,160 B2 * | 5/2013 | Okamoto | ................. | B60G 3/20 280/124.135 |
| 2005/0275183 A1 * | 12/2005 | Amano | .................... | B60G 3/20 280/124.135 |

(Continued)

FOREIGN PATENT DOCUMENTS

| | | | | |
|---|---|---|---|---|
| DE | 102018208391 A1 | * | 11/2019 | |
| JP | 2003335117 A | * | 11/2003 | ............... B60G 3/20 |
| JP | 2020-090129 A | | 6/2020 | |

OTHER PUBLICATIONS

European Search Opinion (Year: 2022).*
Paefgen, Franz-Josef. "New Audi A4." Automobiltechnische Zeitschrift / 96.12 (1994): n. page. Web. (Year: 1994).*

*Primary Examiner* — Jason D Shanske
*Assistant Examiner* — Daniel M. Keck
(74) *Attorney, Agent, or Firm* — Studebaker & Brackett PC

(57) ABSTRACT

A vehicle suspension system smoothly changes a vehicle posture with respect to a steering force and a steering angle by minimizing a kinematic roll at an initial turning stage, thereby allowing a driver to obtain the sensation of maneuvering the vehicle well. The suspension system includes a front suspension having geometry satisfying that a caster angle is +3° to +5°, a caster trail is +20 to +30 mm, an intersection point between a kingpin axis and ground is located on an inner side in a vehicle width direction of a center of a tire contact patch, and an anhedral angle of a lower arm is +2.8° to +7.2°. A rear suspension includes five links and has geometry satisfying that a virtual kingpin axis extends near the center of a tire contact patch of a rear wheel assembly and extends vertically at −2° to 0°.

5 Claims, 16 Drawing Sheets

(52) U.S. Cl.
CPC .... *B60G 2200/156* (2013.01); *B60G 2200/18* (2013.01); *B60G 2204/1244* (2013.01); *B60G 2206/16* (2013.01); *B60G 2206/50* (2013.01); *B60G 2400/05146* (2013.01)

(58) Field of Classification Search
CPC ............ B60G 7/008; B60G 2200/1424; B60G 2200/144; B60G 2200/156; B60G 2200/18; B60G 2200/184; B60G 2200/464; B60G 2204/1244; B60G 2204/143; B60G 2204/148; B60G 2204/416; B60G 2206/16; B60G 2206/50; B60G 2206/604; B60G 2400/05146
See application file for complete search history.

(56) References Cited

U.S. PATENT DOCUMENTS

2014/0008141 A1* 1/2014 Kageyama ............... B60G 3/20
180/400
2018/0111432 A1* 4/2018 Drotar .................... B60G 7/008

* cited by examiner

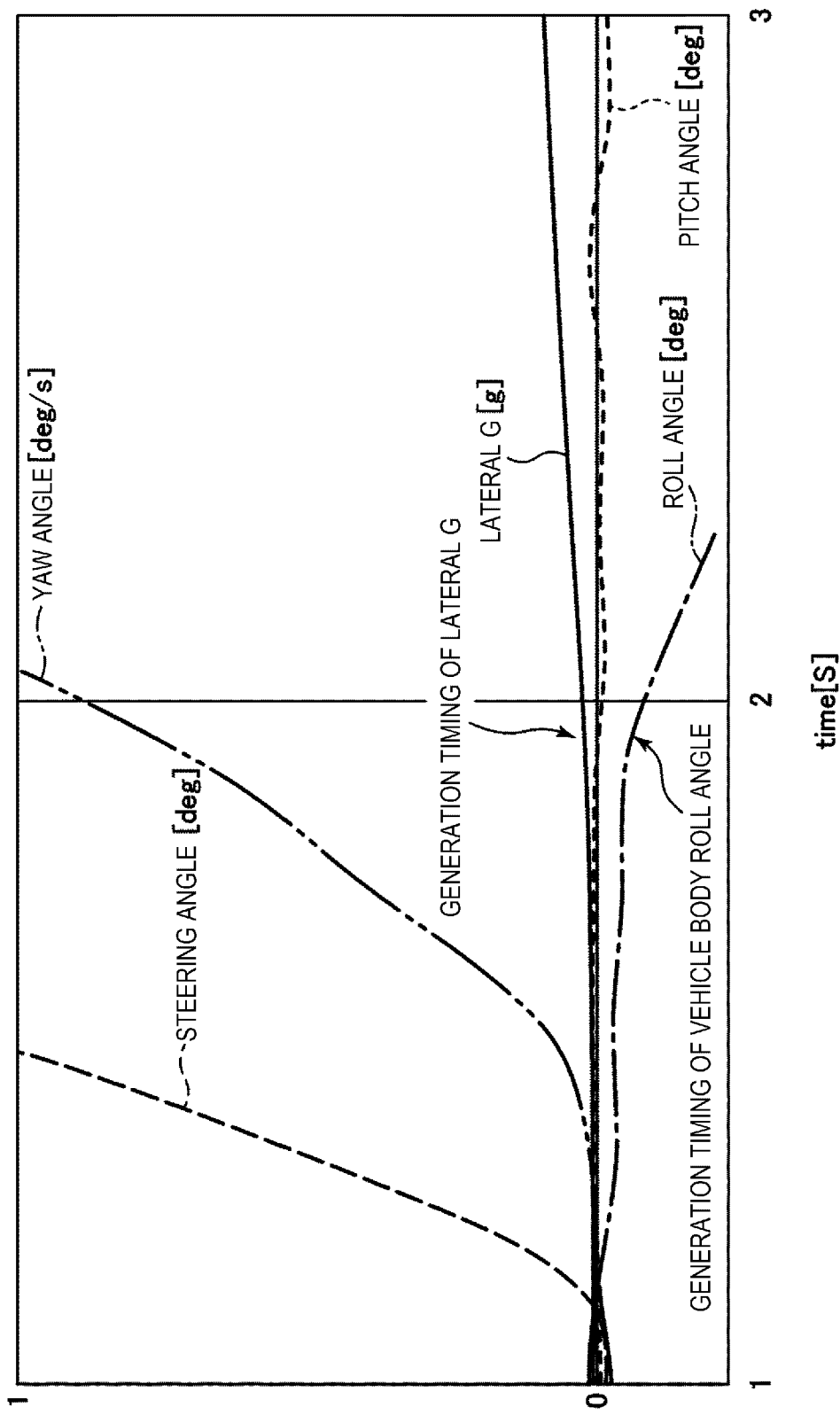

VEHICLE SUSPENSION SYSTEM

TECHNICAL FIELD

The present disclosure relates to a vehicle suspension system and, in particular, to a vehicle suspension system including a front suspension that suspends a front wheel assembly and a rear suspension that suspends a rear wheel assembly.

BACKGROUND

Japanese Patent Document JP-A-2020-90129 discloses a strut-type suspension system. In order to suppress roll of a vehicle body during turn in a corner at a low speed, during steering, the suspension system increases sliding resistance by pressing a piston in a shock absorber with a centrifugal force applied to a vehicle body, and thereby suppresses the roll.

Here, a driver feels the lateral acceleration and roll motion during handling a vehicle and this is well-known behavior to a driver. It is also known that a positional relationship between a center of a tire contact patch and an intersection point between an extension line of a kingpin axis or a virtual kingpin axis as a rotational axis of a wheel (a tire) and the ground affects wheel behavior. It is also a well-known matter that geometries such as a caster angle and a caster trail defined by the kingpin axis are appropriately set in consideration of straight ahead stability, a steering reaction force, and the like when a front suspension is designed, for example.

In view to these facts, the present inventors have found that, at an initial turning stage at which the driver starts steering a steering wheel, mechanical roll of the vehicle body (hereinafter referred to as a "kinematic roll") occurs not due to the lateral acceleration of the vehicle body but due to the change of the geometry of the suspension and thereby a vehicle posture at the initial turning stage is not smoothly changed, which inhibits the driver from obtaining the sensation that the driver is maneuvering the vehicle well.

In other words, for example,
(1) when the driver steers a steering wheel,
(2) first, the "kinematic roll" occurs,
(3) next, yaw occurs, and
(4) then, the kinetic roll occurs due to the lateral acceleration during the turn.

As described above, the vehicle posture is changed in a complicated manner in response to steering, and thus is not changed smoothly. As a result, it inhibits the driver from feeling the vehicle is well under their control.

Here, the "kinematic roll" is the mechanical roll of the vehicle body motion that is the result of the suspension geometry change. Each of right and left front wheels rotates about the kingpin axis (the virtual kingpin axis) having the caster angle during a turn due to a position of the center of a tire contact patch that does not fluctuate during the turn, a caster trail amount from the center of a tire contact patch and the like, and vertically opposite forces are thereby applied from right and left front wheels to right and left sides of the vehicle via right and left front suspension arms.

SUMMARY

In view of the above, the present disclosure has been made to solve the above-described problem and therefore has a purpose of providing a vehicle suspension system that smoothly changes a vehicle posture with respect to a steering force and a steering angle by minimizing a kinematic roll at an initial turning stage, and thereby allows a driver to obtain a sensation of maneuvering the vehicle well.

In order to solve the above-described problem, the present disclosure is a vehicle suspension system including a front suspension that suspends a front wheel and a rear suspension that suspends a rear wheel. The front suspension has geometry satisfying that a caster angle defined by a kingpin axis or a virtual kingpin axis falls within a range of +3° to +5° in a side view, that a caster trail defined by a center of a tire contact patch and one of the kingpin axis and the virtual kingpin axis falls within a range of +20 to +30 mm in the side view, that an intersection point between the ground and an extension line of the kingpin axis or the virtual kingpin axis is located on an inner side in a vehicle width direction of the center of a tire contact patch in a front view, and that a lower arm coupling a vehicle body and a wheel support member is provided, and an anhedral angle of the lower arm falls within a range of +2.8° to +7.2° in the front view. The rear suspension includes five links that couple the vehicle body and the wheel support member, and has geometry satisfying that the virtual kingpin axis extends near the center of a tire contact patch of the rear wheel and extends vertically at an angle within a range of −2° to 0°.

According to the thus-configured present disclosure, the front suspension has a geometry satisfying that the caster angle falls within the range of +3° to +5°, that caster trail falls within the range of +20 to +30 mm in the side view, that the intersection point between the ground and the extension line of the kingpin axis or the virtual kingpin axis is located on the inner side in the vehicle width direction of the center of a tire contact patch in the front view, and that the anhedral angle of the lower arm coupling the vehicle body and the wheel support member falls within the range of +2.8° to +7.2° in the front view. The rear suspension includes the five links that couple the vehicle body and the wheel support member, and has a geometry satisfying that the virtual kingpin axis extends near the center of a tire contact patch of the rear wheel and extends vertically at the angle within the range of −2° to 0°. Thus, kinematic roll at an initial turning stage can be minimized. In this way, a vehicle posture can be changed smoothly by a roll posture caused by a centrifugal force during a steady turn while roll occurred by a steering force and a steering angle is suppressed at an initial turning stage. In other words, with the geometry of the front suspension and the geometry of the rear suspension, for example, in vehicle behavior about three axes of the vehicle, after occurrence of a tire lateral force and occurrence of yaw motion associated therewith, roll motion can occur in addition to lateral acceleration applied to the vehicle. Here, the virtual kingpin axis in the rear suspension of the present disclosure extends near the center of a tire contact patch of the rear wheel and extends vertically at an angle within the range of −2° to 0°. Thus, a roll steer tendency at the rear is suppressed. In addition, "kinematic roll" in front can also be suppressed by suppressing roll of the entire vehicle body.

As it has been described so far, according to the present disclosure, it is possible to minimize the "kinematic roll", which causes the vehicle body to roll mechanically at the initial turning stage, so as to suppress roll at the initial turning stage. Meanwhile, when turn becomes steady, the roll posture is due to the centrifugal force, so as to allow a driver to feel a smooth turn. As a result, the driver can effectively obtain a sensation of maneuvering the vehicle well.

In the appended claims, a recitation that defines a numerical range as a "range of A to B" includes A and B as an upper limit value and a lower limit value.

In the present disclosure, preferably, the front suspension is a double wishbone type suspension that includes: the wheel support member that supports the front wheel in a freely rotatable manner; an upper arm that extends in the vehicle width direction from a coupled section on the vehicle body side and, on a vehicle upper side of a wheel center of the front wheel, is coupled to the wheel support member via a pivot section; and the lower arm that extends in the vehicle width direction from a coupled section on the vehicle body side and, on a vehicle lower side of the wheel center of the front wheel, is coupled to the wheel support member via a pivot section. The kingpin axis is preferably defined by a line that connects the pivot section of the upper arm and the pivot section of the lower arm.

According to the thus-configured present disclosure, in the front suspension of the double wishbone type, the kinematic roll at the initial turning stage can be minimized while suspension support rigidity is secured effectively. In this way, the vehicle posture can be changed smoothly by the roll posture caused by the centrifugal force during a steady turn while the roll due to the steering force and the steering angle is suppressed at the initial turning stage.

In the present disclosure, preferably, the front suspension is a strut-type suspension that includes the wheel support member that supports the front wheel in a freely rotatable manner; a damper that couples the vehicle body and the wheel support member; and the lower arm that extends in the vehicle width direction from a coupled section on the vehicle body side and is coupled to the wheel support member via a pivot section. The kingpin axis is preferably defined by a line that connects an attachment section of the damper to the vehicle body and the pivot section of the lower arm. Alternatively, the front suspension is preferably a multi-link type suspension that includes the wheel support member that supports the front wheel in the freely rotatable manner; and five links that couple the front wheel and the wheel support member. The virtual kingpin axis is preferably defined by an upper link, a leading link, a trailing link, and a lower link as the lower arm of the five links.

According to the thus-configured present disclosure, in the strut-type front suspension or the multi-link type front suspension, the kinematic roll at the initial turning stage of the suspension can be minimized. In this way, the vehicle posture can be changed smoothly by the roll posture caused by the centrifugal force during steady turn while the roll due to the steering force and the steer angle is suppressed at the initial turning stage.

In the present disclosure, preferably, the rear suspension includes the wheel support member that supports the rear wheel in the freely rotatable manner; an upper link that extends to a vehicle rear side from a coupled section on the vehicle body side and, on the vehicle upper side of a wheel center of the rear wheel, is coupled to the wheel support member via a pivot section; a leading link that extends to a vehicle front side from a coupled section on the vehicle body side and, on the vehicle upper side of the wheel center of the rear wheel, is coupled to the wheel support member via a pivot section; a trailing link that extends to the vehicle rear side from a coupled section on the vehicle body side and, on a vehicle lower side of the wheel center of the rear wheel, is coupled to the wheel support member via a pivot section; a lower link that extends to the vehicle front side from a coupled section on the vehicle body side and, on the vehicle lower side of the wheel center of the rear wheel, is coupled to the wheel support member via a pivot section; and a toe control link that extends in the vehicle width direction from a coupled section on the vehicle body side and is coupled to the wheel support member via a pivot section. The virtual kingpin axis is preferably defined by vertically connecting an intersection point on a virtual extension line of each of the upper link and the leading link and an intersection point on a virtual extension line of each of the trailing link and the lower link, and the pivot section of the upper link and the pivot section of the leading link are preferably arranged adjacent to each other at positions on the vehicle front side of the wheel center of the rear wheel assembly.

According to the thus-configured present disclosure, the pivot section of the upper link and the pivot section of the leading link in the wheel support member are arranged adjacent to each other at positions on the vehicle front side of the wheel center of the rear wheel. In this way, it is possible to further reliably minimize the front kinematic roll at the initial turning stage by preventing displacement of the virtual kingpin axis in the rear suspension during a turn.

In the present disclosure, preferably, in the rear suspension, the pivot section of the upper link and the pivot section of the leading link are arranged to overlap each other in a vehicle longitudinal direction in plan view and to overlap each other in a vehicle vertical direction and the vehicle width direction in a front view.

According to the thus-configured present disclosure, the pivot section of the upper link and the pivot section of the leading link in the wheel support member can reliably be arranged adjacent to each other. In addition, displacement of the virtual kingpin axis can be prevented. Therefore, it is possible to further reliably minimize the kinematic roll at the initial turning stage.

According to the vehicle suspension system of the present disclosure, the vehicle posture is smoothly changed with respect to the steering force and the steering angle by minimizing the kinematic roll at the initial turning stage. In this way, the driver can obtain the sensation of maneuvering the vehicle well.

BRIEF DESCRIPTION OF THE DRAWINGS

FIG. 16 is a line diagram for explaining an example of vehicle motion at an initial steering stage that is obtained by a test of a vehicle on which the vehicle suspension system according to the embodiment of the present disclosure is mounted.

DETAILED DESCRIPTION

A description will hereinafter be made of a vehicle suspension system according to an embodiment of the present disclosure with reference to the accompanying drawings.

Figure 1:
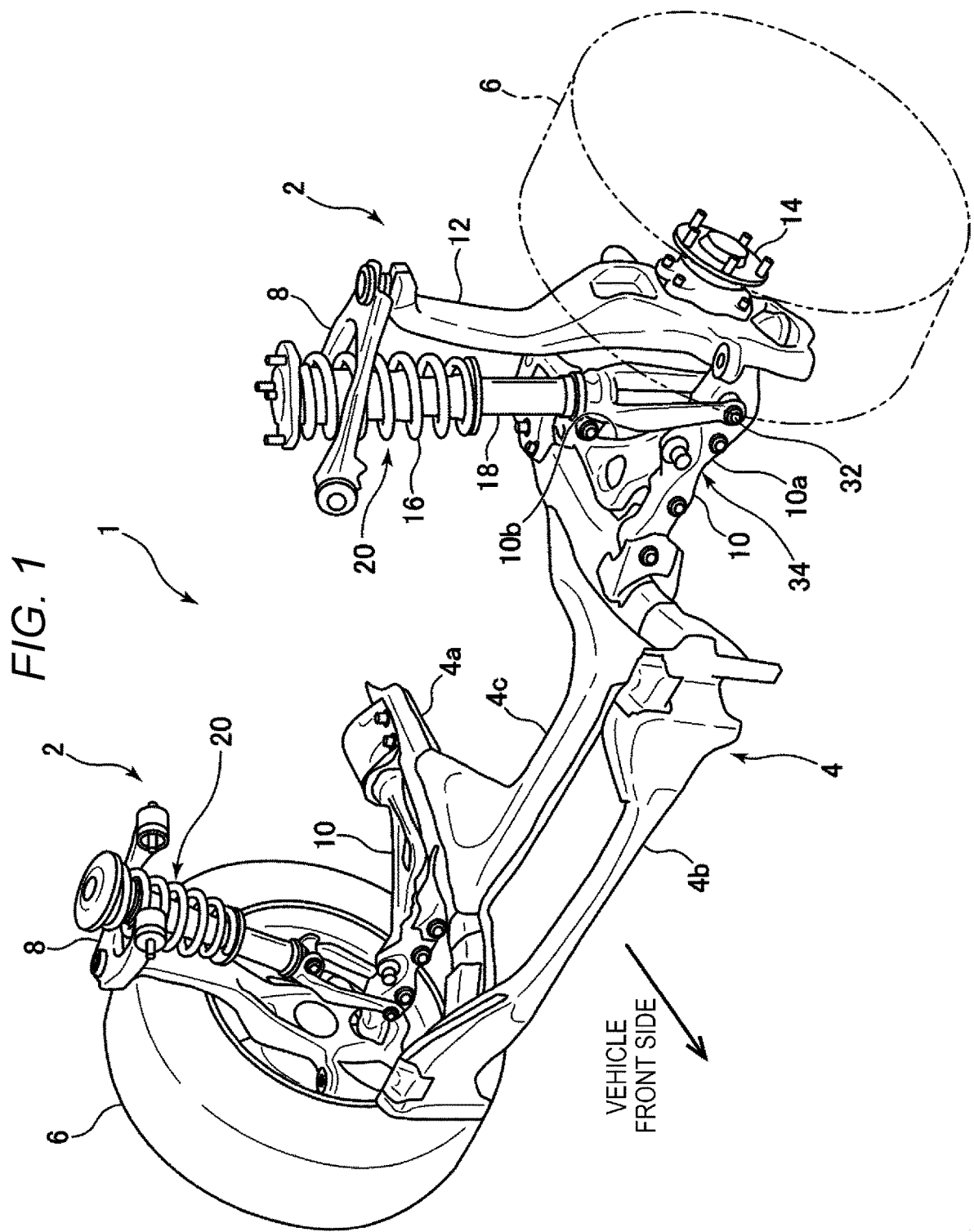
FIG. 1 is a perspective view of a front suspension assembly that is provided in a vehicle suspension system according to an embodiment of the present disclosure.

First, a description will be made of an overall configuration of a front suspension in the vehicle suspension system according to the embodiment of the present disclosure with reference to FIGS. 1 to 3. FIG. 1 is a perspective view of a front suspension assembly that is provided in the vehicle suspension system according to the embodiment of the present disclosure, FIG. 2 is a top view of the front suspension assembly illustrated in FIG. 1, and FIG. 3 is a front view of the front suspension assembly illustrated in FIG. 1.

Figure 2:
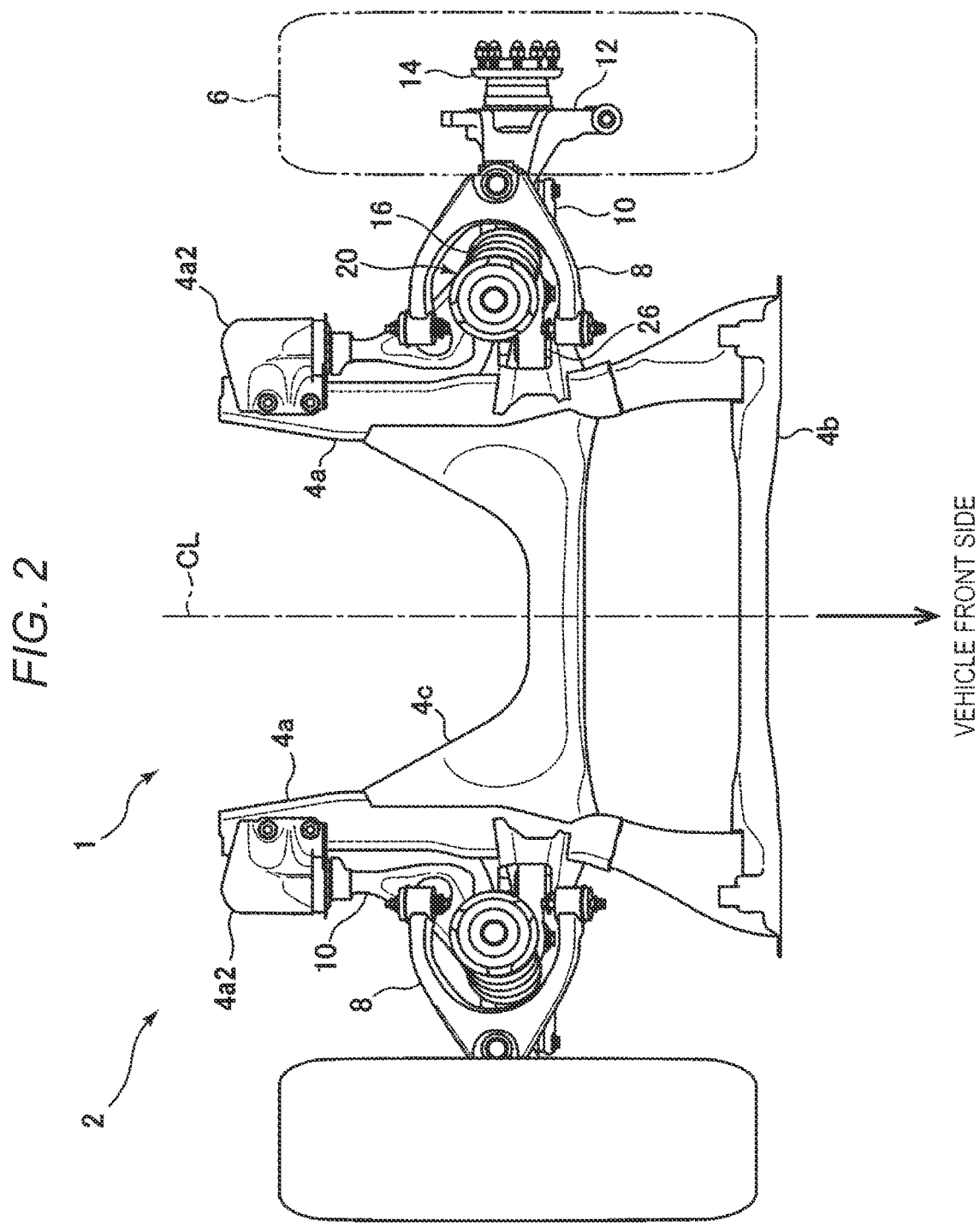
FIG. 2 is a top view of the front suspension assembly illustrated in FIG. 1.
Figure 3:
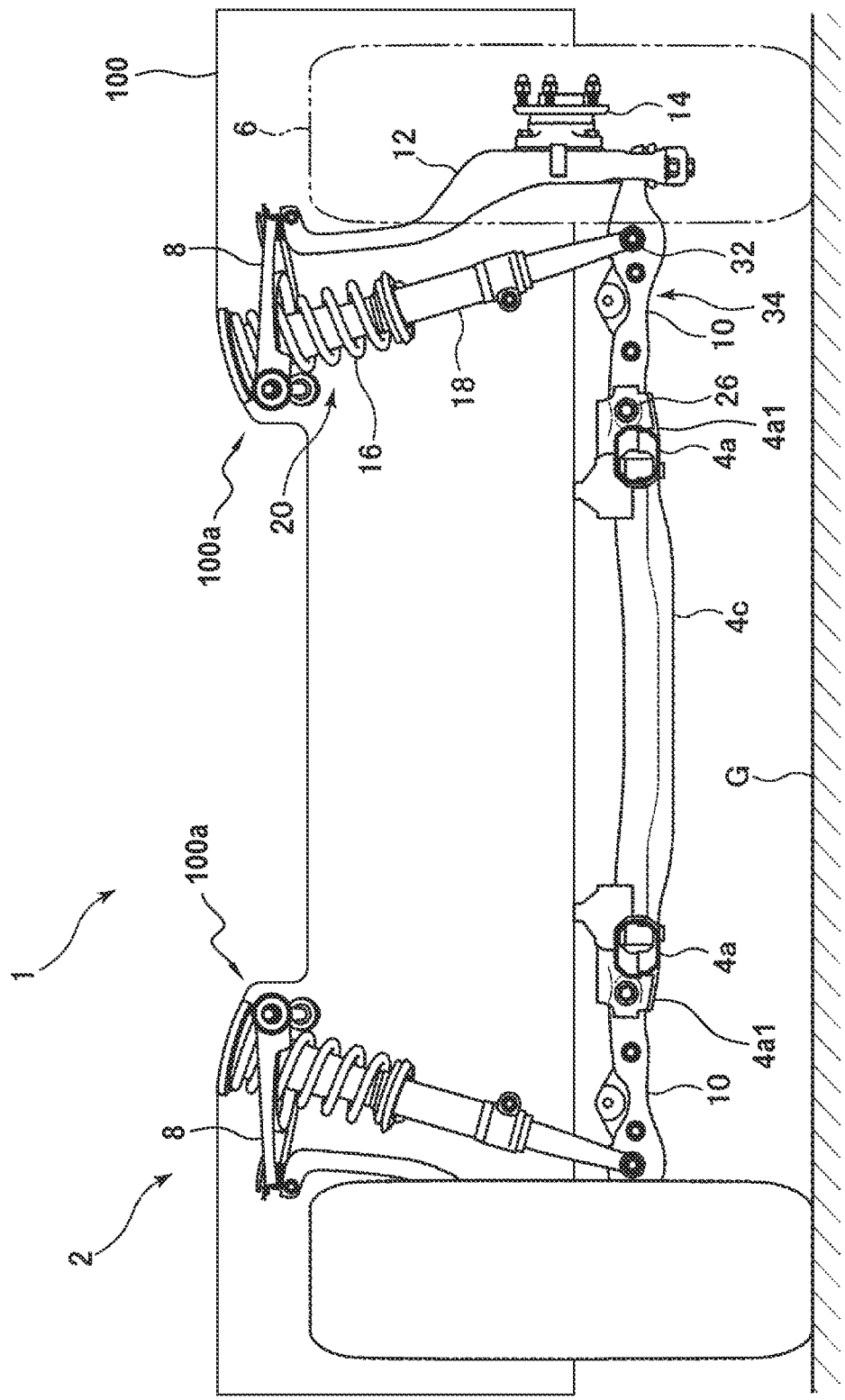
FIG. 3 is a front view of the front suspension assembly illustrated in FIG. 1.

First, as illustrated in FIG. 1 to FIG. 3, a vehicle suspension system 1 includes a right and left pair of front suspensions 2, and these front suspensions 2 are attached to a front subframe (a suspension subframe) 4 that is fixed to a vehicle body 100.

This front subframe 4 mainly includes: a right and left pair of side crossmembers 4a; a front crossmember 4b that extends in a manner to couple front end portions of these side crossmembers 4a in a vehicle width direction; and a rear crossmember 4c that extends in a U-shape in plan view on a vehicle rear side of this front crossmember 4b, and extends in a manner to couple areas from center portions to rear portions of the side crossmembers 4a in the vehicle width direction. In FIG. 3, the front crossmember 4b is not illustrated in order to illustrate the front suspension 2. In FIG. 3, a center plane in a right-left direction of the vehicle body 100 is denoted by a reference sign CL.

The front suspension 2 in this embodiment is of a double wishbone type, and includes: an upper arm 8 that is attached to the vehicle body 100 at a position above a front wheel assembly 6; a lower arm 10 that is attached to the side crossmember 4a at a position below the upper arm 8; and a wheel support (a wheel support member) 12 that is attached to these upper arm 8 and lower arm 10. The upper arm 8 and the lower arm 10 swing vertically about swing axes 24, 30, which will be described below, on the vehicle body side, respectively. In this way, the wheel support 12 and the front wheel assembly 6 stroke vertically along a specified trajectory. The wheel support 12 is a hub carrier that supports a hub 14, to which a wheel (not illustrated) of the front wheel assembly 6 is attached.

In addition, the front suspension 2 is provided with a shock absorber 20 that includes a coil spring 16 and a damper 18. The shock absorber 20 simultaneously applies a specified urging force and a specified damping force while allowing a stroke of the front wheel assembly 6. This shock absorber 20 has a cylindrical shape that is long in the vertical direction and in which the coil spring 16 and the damper 18 are arranged in a substantially coaxial manner. An upper end portion of the shock absorber 20 is attached to the vehicle body 100, and a lower end portion thereof (a lower end portion of the damper 18) is attached to the lower arm 10 in a freely rotatable manner.

Although not illustrated, the front suspension 2 has: a steering gear unit; a tie rod that extends outward in the vehicle width direction from this steering gear unit, is attached to the wheel support 12, and steers the front wheel assembly 6; and the like. An anti-roll bar (not illustrated) that extends in the vehicle width direction to couple the right and left lower arms 10 is rotatably attached to the lower arms 10 and the front crossmember 4b.

Figure 4:
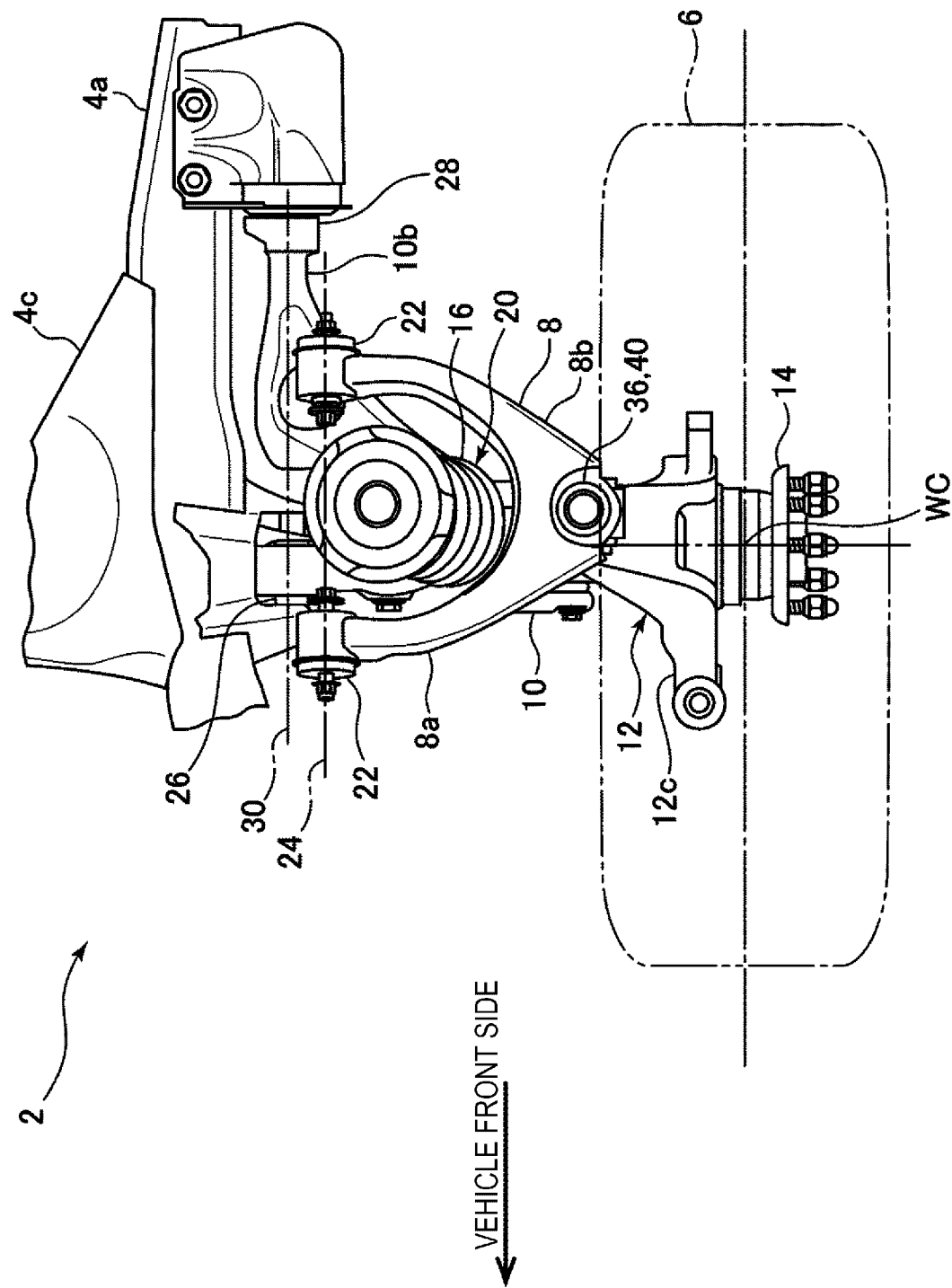
FIG. 4 is a top view of a front suspension on a vehicle left side according to this embodiment.
Figure 5:
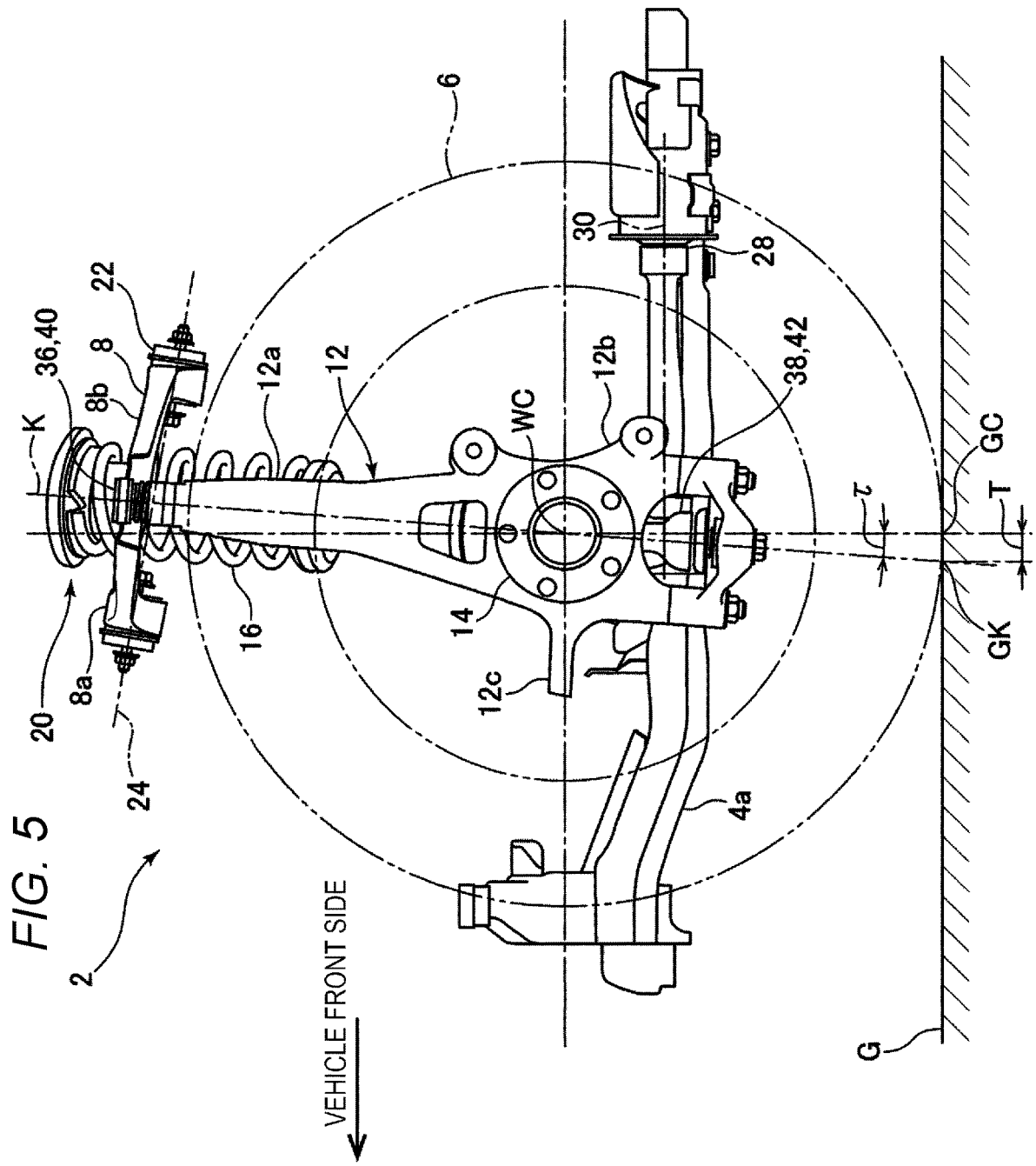
FIG. 5 is a side view of the front suspension on the vehicle left side according to this embodiment.
Figure 6:
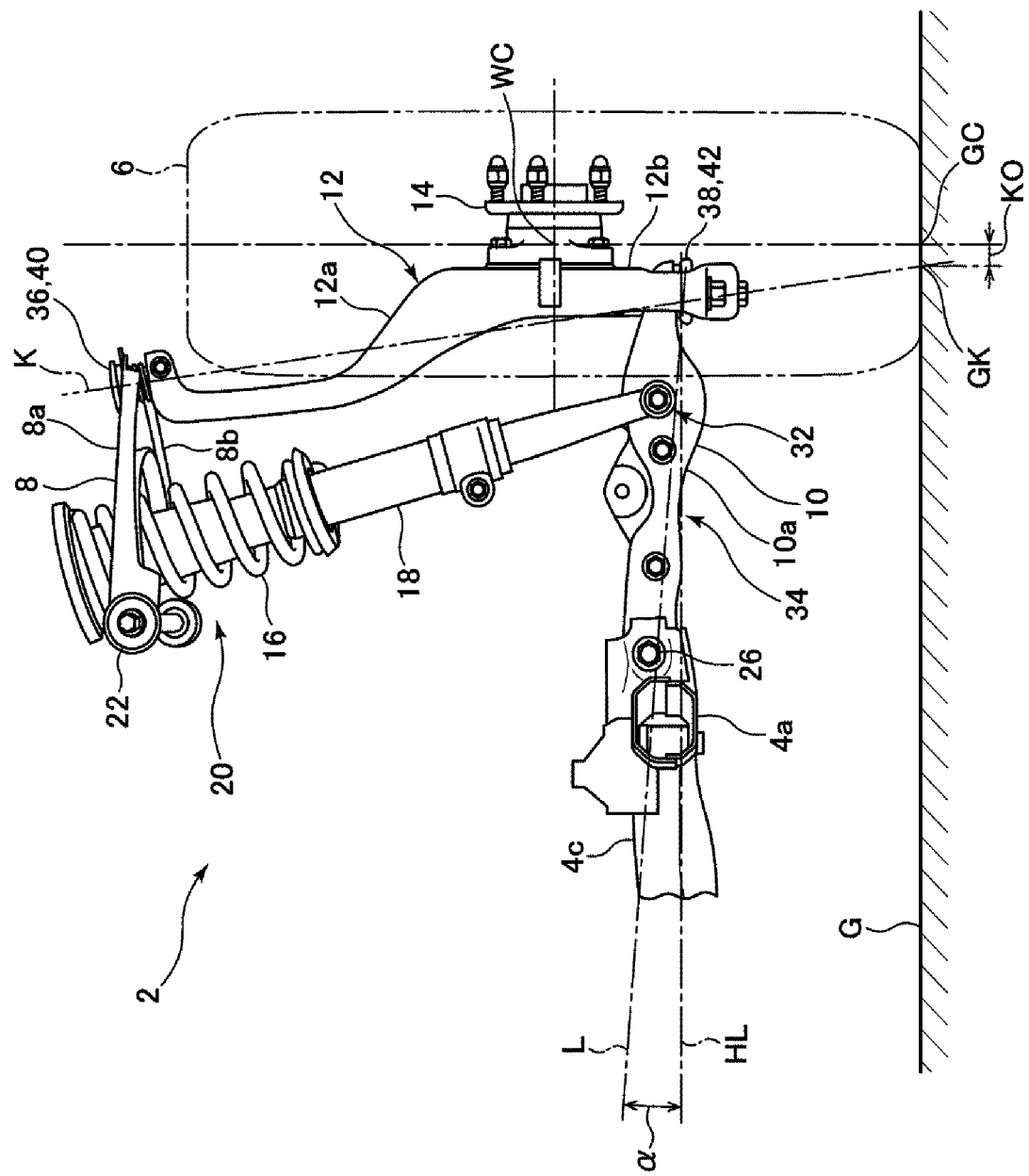
FIG. 6 is a front view of the front suspension on the vehicle left side according to this embodiment.

Next, a specific description will be made on a configuration of the front suspension 2 with reference to FIG. 4 to FIG. 6. FIG. 4 is a top view of the front suspension on a vehicle left side according to this embodiment, FIG. 5 is a side view of the front suspension on the vehicle left side according to this embodiment, and FIG. 6 is a front view of the front suspension on the vehicle left side according to this embodiment. Here, since the front suspension 2 on a right front wheel side and the front suspension 2 on a left front wheel side have the same basic structure, a description herein will be centered on the front suspension on the left front wheel side.

First, as illustrated in FIG. 4 to FIG. 6, the upper arm 8 is an A-shaped arm in which a front arm section 8a and a rear arm section 8b are integrally formed. The front arm section 8a extends outward in the vehicle width direction and diagonally rearward, and the rear arm section 8b extends outward in the vehicle width direction and diagonally forward. Two end portions on an inner side in the vehicle width direction of this upper arm 8 are each coupled to the vehicle body 100 by a first coupled section 100a on the vehicle body side via a cylindrical elastic bush 22 that has a center axis in a vehicle body longitudinal direction. By these elastic bushes 22, the swing axis 24 of the upper arm 8 extending in the vehicle longitudinal direction is defined. In a side view, an axis of the elastic bush 22 and the swing axis 24 are inclined several degrees to the rear of the vehicle.

The lower arm 10 is an A-shaped arm that has a front arm section 10a and a rear arm section 10b. The front arm section 10a extends substantially in the vehicle width direction, and the rear arm section 10b extends outward in the vehicle width direction and diagonally forward. In this lower arm 10, an inner end portion in the vehicle width direction of the front arm section 10a is coupled to the side crossmember 4a at a second coupled section 4a1 on the vehicle body side via a cylindrical elastic bush 26 that has a center axis in the vehicle body longitudinal direction. An inner end portion in the vehicle width direction and the vehicle rear side of the rear arm section 10b is coupled to the side crossmember 4a at the second coupled section 4a1 on the vehicle body side via a cylindrical elastic bush 28 that has a center axis in the vehicle body longitudinal direction. These elastic bushes 26, 28 define the swing axis 30 of the lower arm 10 extending in the vehicle longitudinal direction. Here, the rear arm section 10b has a so-called gamma-shape. An outer end portion in the vehicle width direction thereof is fastened at two positions to a center portion 34 of the front arm section 10a. The center portion 34 is located inward in the vehicle width direction from a coupled section 32 in the lower end portion of the damper 18 (see FIG. 1 and FIG. 6).

Outer end portions in the vehicle width direction of the upper arm 8 and the lower arm 10 are coupled to the wheel support 12 via pivot sections 36, 38, respectively. More specifically, as illustrated in FIG. 5 and FIG. 6, the wheel support 12 has: an extending section 12a that extends upward to couple the upper arm; and an extending section 12b that extends downward to couple the lower arm. The arms 8, 10 are respectively coupled to an upper end portion of the extending section 12a and a lower end portion of the extending section 12b via ball joints (pillow ball joints) 40, 42 that respectively form the pivot sections 36, 38. In addition, as illustrated in FIG. 4 and FIG. 5, the wheel support 12 includes an extending section (a knuckle arm) 12c that extends in the front direction of the vehicle body 100 to couple the tie rod. The tie rod (not illustrated) is attached to a tip portion of this extending section 12c.

Next, as illustrated in FIG. 5 and FIG. 6, a kingpin axis K as a rotational axis of the front wheel assembly 6 is defined in the front suspension 2. The kingpin axis K is defined on a straight line (indicated by a one-dot chain line in the drawings) that connects a center of the above-described pivot section 36 on the front wheel assembly 6 side of the upper arm 8 and a center of the pivot section 38 on the front wheel assembly 6 side of the lower arm 10.

In addition, a wheel center of the front wheel assembly 6 is denoted by a reference sign WC in FIG. 4 to FIG. 6. In FIG. 4, a center axis in the vehicle width direction of the front wheel assembly 6 through the wheel center WC and a line indicating a vertical center plane of the front wheel assembly 6 are each indicated by a one-dot chain line. In FIG. 5 and FIG. 6, a perpendicular axis and a horizontal axis, each of which extends through the wheel center WC, and which respectively divide the front wheel assembly 6 into two in the longitudinal direction and the vertical direction, are each indicated by a one-dot chain line.

Next, a description will be made of the main geometry of the front suspension 2 according to the embodiment of the present disclosure with reference to FIG. 5 to FIG. 7B. FIG. 7A is a schematic view for explaining the geometry of the front suspension according to this embodiment and in which the right front wheel is seen from the front, and FIG. 7B is a schematic view for explaining the geometry of the front suspension according to this embodiment and in which the right front wheel is seen from the inner side in the vehicle width direction.

Figure 7B:
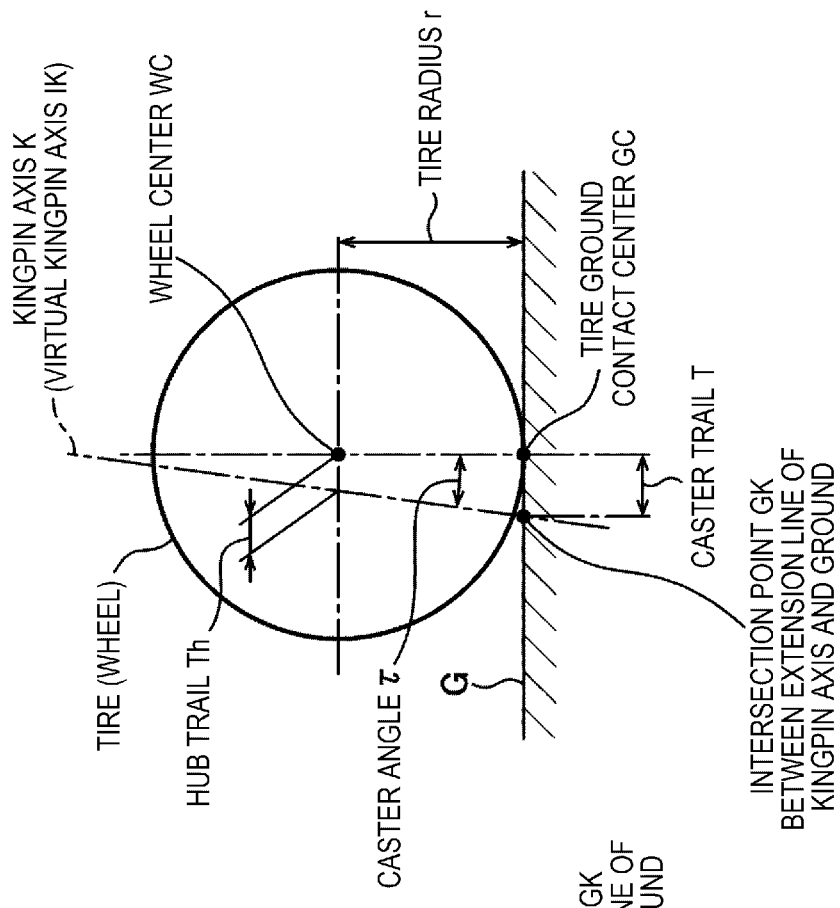
FIG. 7B is a schematic view for explaining the geometry of the front suspension according to this embodiment and in which the right front wheel is seen from an inner side in a vehicle width direction.
Figure 7A:
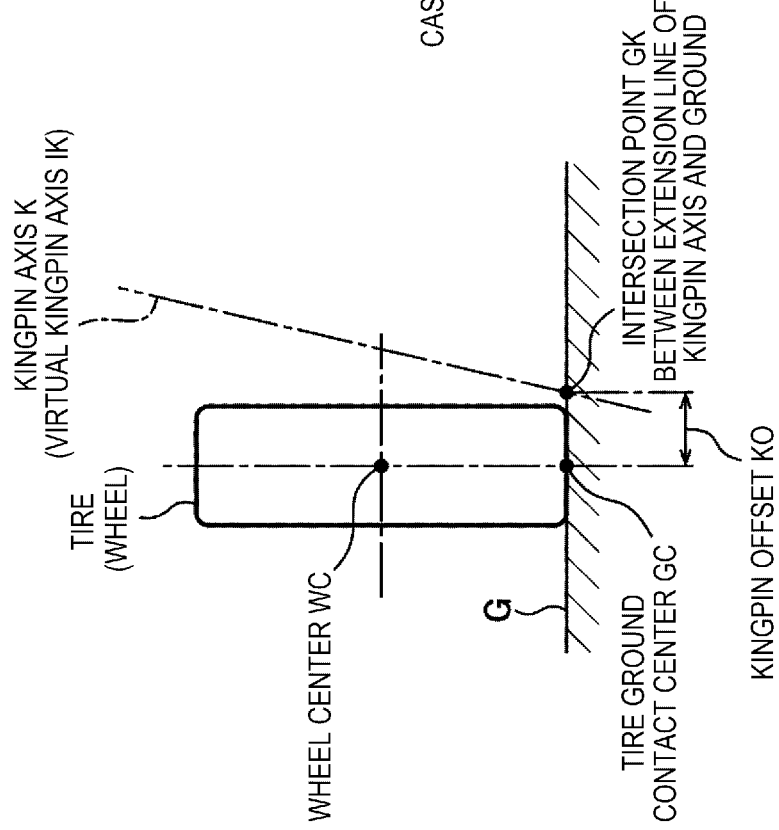
FIG. 7A is a schematic view for explaining geometry of the front suspension according to this embodiment and in which a right front wheel is seen from the front.

First, "TIRE (WHEEL)" illustrated in FIG. 7A and FIG. 7B is the front wheel assembly 6. As illustrated in FIG. 7A, in front view, a distance between a center of a tire contact patch (a pressure center of a tire contact patch) GC and an intersection point GK between the kingpin axis K and ground G corresponds to a so-called kingpin offset KO. In this embodiment, as illustrated in FIG. 6, geometries of the arms 8, 10, the damper 18, and the like, a camber angle of the front wheel assembly 6, and the like are set such that a value of this kingpin offset KO is positive (+) within a range of 13 mm to 22 mm, that is, the intersection point GK between an extension line of the kingpin axis K and the ground G is located on the inner side in the vehicle width direction of the center of a tire contact patch GC in the front view.

In the description of this embodiment, a description that defines a numerical range as a "range of A to B" includes A and B as an upper limit value and a lower limit value. For example, the above-described "range of 13 mm to 22 mm" is a range that is equal to or longer than 13 mm and equal to or shorter than 22 mm. The same will be applied below.

Next, as illustrated in FIG. 7B, in the side view, a caster angle ti is an angle defined by the kingpin axis K and a vertical line. In this embodiment illustrated in FIG. 5, the geometries of the arms 8, 10, the damper 18, and the like are set such that the caster angle ti becomes about 4°. In this embodiment, a value of this caster angle ti of the front wheel assembly 6 only needs to fall within a range of 3° to 5°. The caster angle ti is positive (+) in a direction in which an upper portion of the kingpin axis K is tilted rearward in the side view.

In addition, as illustrated in FIG. 7B, in the side view, a distance between the center of a tire contact patch GC and the intersection point GK between the extension line of the kingpin axis K and the ground G is a caster trail T. In this embodiment illustrated in FIG. 5, the geometries of the arms 8, 10, the damper 18, and the like are set such that a value of the caster trail T is about 21 mm. In this embodiment, the value of this caster trail T only needs to fall within a range of +20 mm to +30 mm. The caster trail T is positive (+) when the intersection point GK is located in front of the center of a tire contact patch GC in the side view.

Here, as illustrated in FIG. 7B, the caster trail T and the caster angle ti have a relationship that is expressed by the following equation (1) when being schematically expressed trigonometrically by using a so-called hub trail (a caster trail of the wheel center) Th and a tire radius r.

$$T = r \times \sin(\tau) + Th \qquad \text{Equation (1)}$$

wherein
T is the caster trail,
r is the tire radius,
$\tau$ is the caster angle, and
Th is the hub trail.

For example, in the case where the tire in 18-inch size is mounted to the front wheel assembly 6 and the hub trail is 5 mm, in this embodiment, the value of the caster trail T is calculated as follows by the equation (1), $$20.9 \text{ mm} = 25.4 \text{ mm}(18 \text{ inches}) \div 2 \times \sin(\tau)(4°) + 5 \text{ mm}$$

and is about 21 mm. In this embodiment, tire sizes of 16 inches to 19 inches are assumed for the front wheel assembly 6, and the value of the caster trail T is set within a range of +20 mm to +30 mm according to the values such as of the caster angle $\tau$, the tire radius (the radius r), and the hub trail Th.

Next, as illustrated in FIG. 6, in this embodiment, the lower arm 10 is arranged such that an anhedral angle $\alpha$ is about 5°. In this embodiment, this anhedral angle $\alpha$ of the lower arm 10 is set to fall within a range of +2.8° to +7.2° according to variations such as a wheelbase of the vehicle on which the vehicle suspension system 1 in this embodiment is mounted, a tire width thereof, and vehicle weight (mainly assuming an engine in a different specification).

In this embodiment, in the front view, the anhedral angle $\alpha$ of the lower arm 10 is set as an upward arm angle from the wheel side toward the vehicle body 100, and is an angle that is defined by a horizontal line HL and a line L connecting the center of the pivot section 38 on the front wheel assembly 6 side and a center axis of the elastic bush 26 on the vehicle body side in the front arm section 10a of the lower arm 10. In this embodiment, since the elastic bush 26 and the elastic bush 28 on the vehicle body side in the lower arm 10 are set at substantially the same height in the vehicle longitudinal direction, the anhedral angle α may be set as an angle that is defined by a line connecting the center of the pivot section 38 on the front wheel assembly 6 side and the swing axis 30 of the lower arm 10. A jack-up force that is caused due to such an anhedral angle α of the lower arm 10 serves as a resisting force that suppresses a kinematic roll itself.

Here, as a modified example of the front suspension 2 in this embodiment, a strut-type front suspension may be adopted instead of the above-described double wishbone type front suspension. Although not illustrated, the strut-type front suspension includes: a wheel support member that supports the front wheel in the freely rotatable manner; a damper that couples the vehicle body 100 and the wheel support member; and a lower arm that extends in the vehicle width direction from a coupled section on the vehicle body side and is coupled to the wheel support member via a pivot section, and the kingpin axis K is defined by a line that connects an attachment section of the damper to the vehicle body 100 and the pivot section of the lower arm.

In this modified example, similar to the above-described embodiment, as illustrated in FIGS. 7A and 7B, the strut-type front suspension only needs to have geometry satisfying that the caster angle τ defined by the kingpin axis K falls within a range of +3° to +5°, that the caster trail T defined by the kingpin axis K and the center of a tire contact patch GC falls within the range of +20 to +30 mm, that the intersection point GK between the extension line of the kingpin axis K and the ground G is located on the inner side in the vehicle width direction of the center of a tire contact patch GC in the front view, and that the anhedral angle α of the lower arm coupling the vehicle body 100 and the wheel support member falls within the range of +2.8° to +7.2°.

As a further modified example of the front suspension 2 in this embodiment, instead of the above-described double wishbone type, a multi-link type front suspension may be adopted. Although not illustrated, the multi-link type front suspension includes: the wheel support member that supports the front wheel in the freely rotatable manner; and five links that couple the wheel and the wheel support member. A virtual kingpin axis is defined by arrangement of an upper link, a leading link, a trailing link, and a lower link of the five links.

In this modified example, similar to the above-described embodiment, as illustrated in FIGS. 7A and 7B, the multi-link type front suspension only needs to have geometry satisfying that the caster angle ti defined by a virtual kingpin axis IK falls within the range of +3° to +5°, that the caster trail T defined by the virtual kingpin axis IK and the center of a tire contact patch GC falls within the range of +20 to +30 mm, that the intersection point GK between an extension line of the virtual kingpin axis IK and the ground G is located on the inner side in the vehicle width direction of the center of a tire contact patch GC, and that the anhedral angle α of the lower link coupling the vehicle body 100 and the wheel support member falls within the range of +2.8° to +7.2°.

Figure 8:
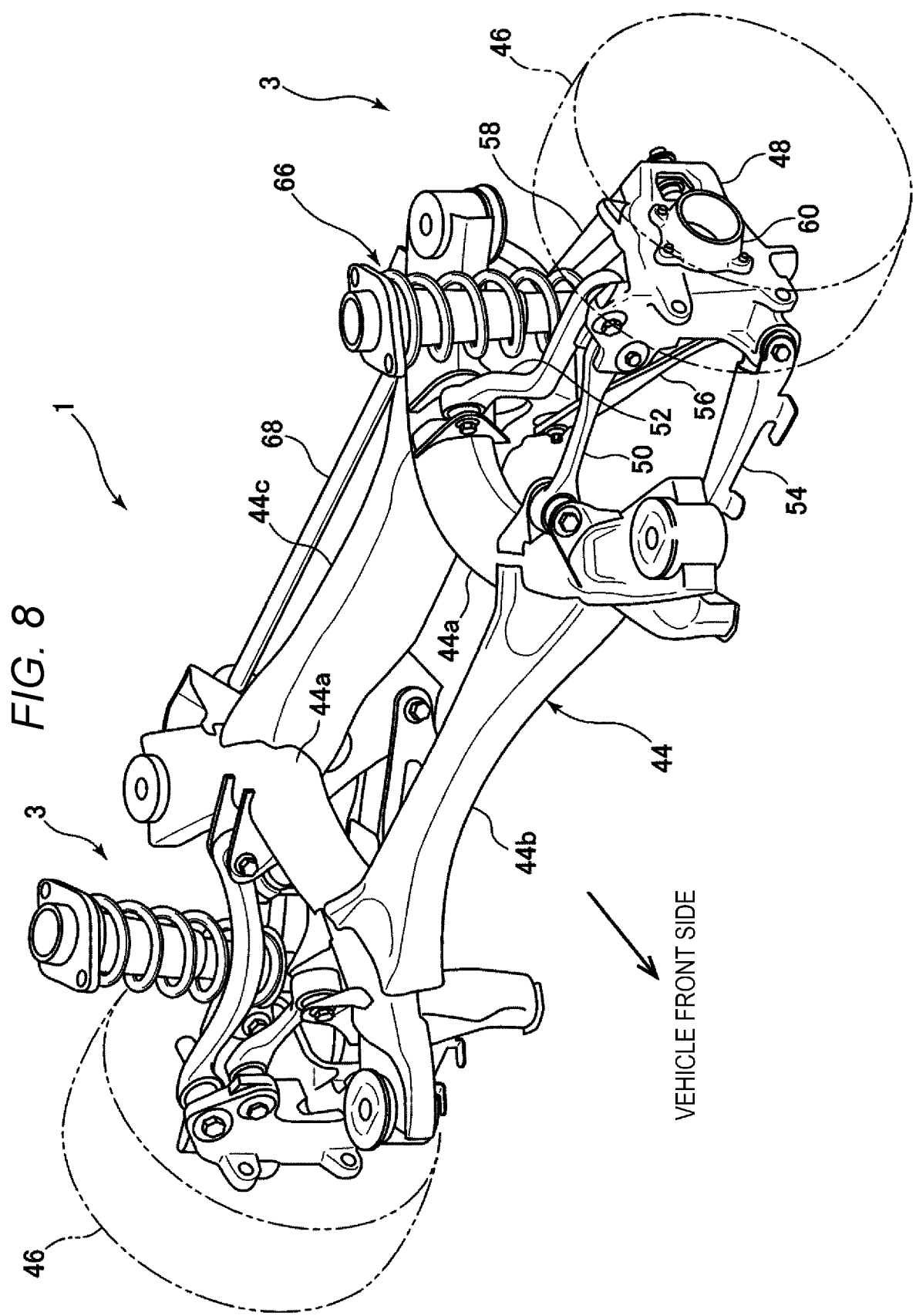
FIG. 8 is a perspective view of a rear suspension assembly that is provided in the vehicle suspension system according to the embodiment of the present disclosure.

Next, a description will be made of an overall configuration of a rear suspension 3 in the vehicle suspension system according to the embodiment of the present disclosure with reference to FIGS. 8 to 10. FIG. 8 is a perspective view of a rear suspension assembly that is provided in the vehicle suspension system according to the embodiment of the present disclosure, FIG. 9 is a top view of the rear suspension assembly illustrated in FIG. 8, and FIG. 10 is a rear view of the rear suspension assembly illustrated in FIG. 8.

Figure 9:
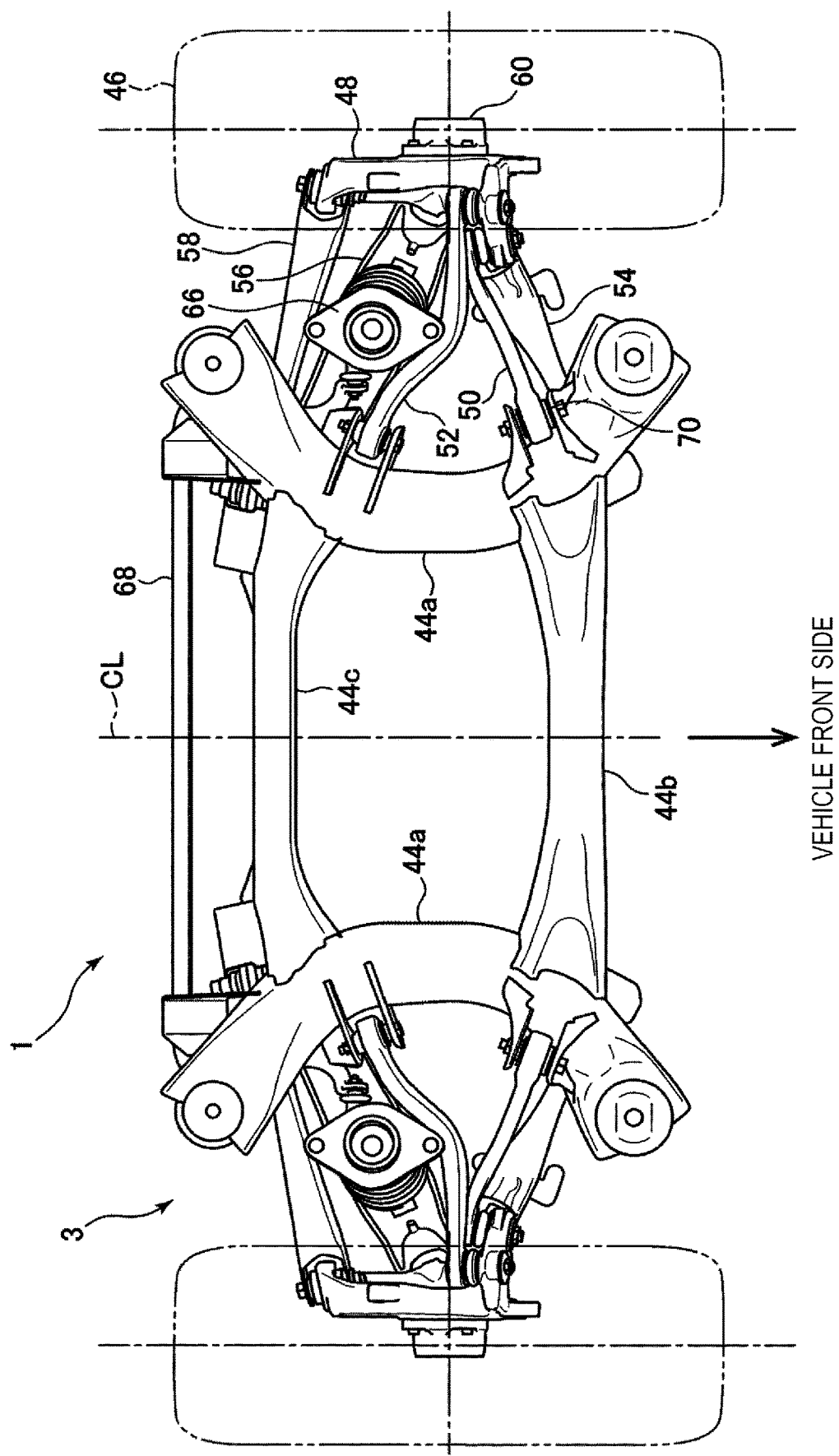
FIG. 9 is a top view of the rear suspension assembly illustrated in FIG. 8.
Figure 10:
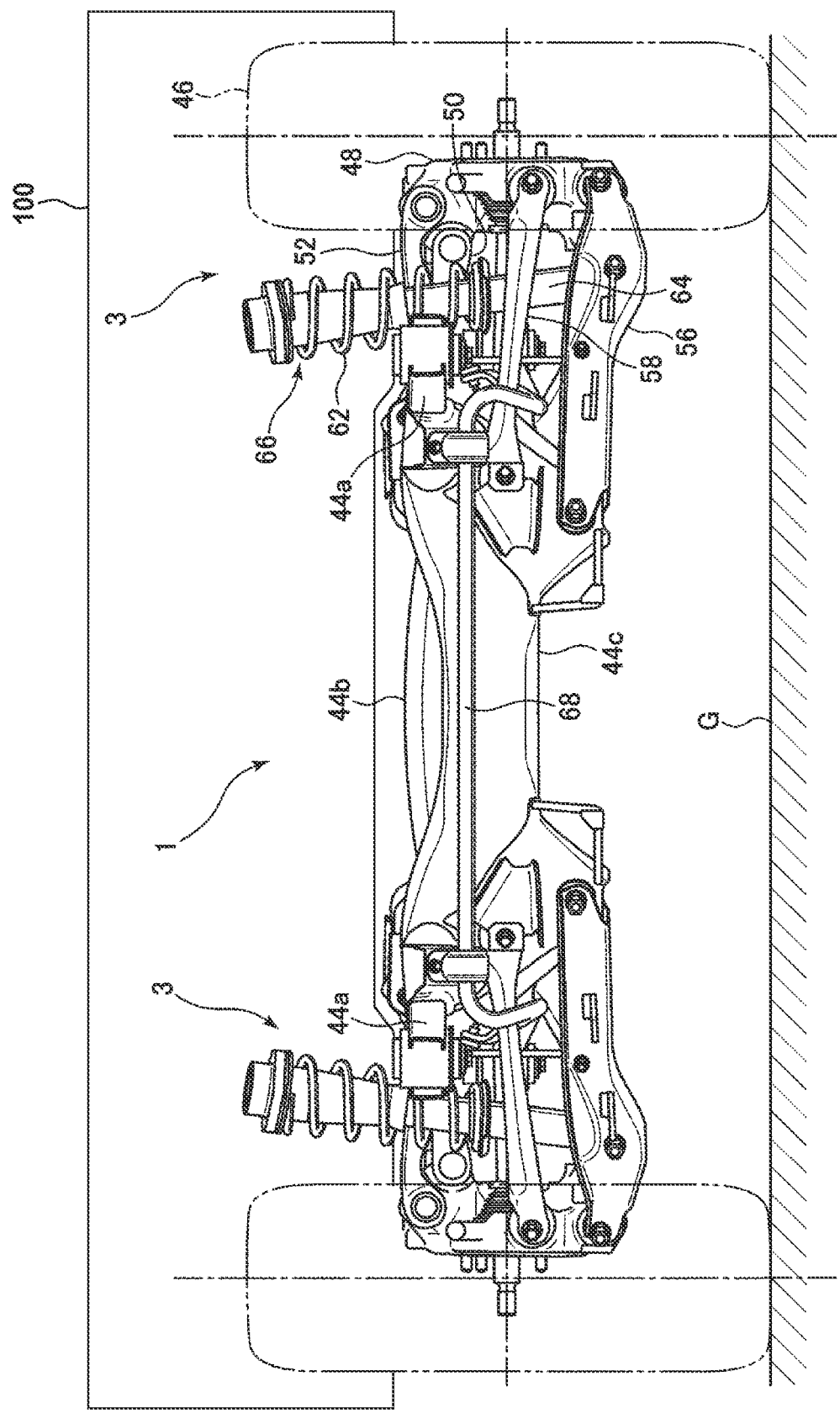
FIG. 10 is a rear view of the rear suspension assembly illustrated in FIG. 8.

First, as illustrated in FIG. 8 to FIG. 10, the vehicle suspension system 1 includes a right and left pair of the rear suspensions 3, and these rear suspensions 3 are attached to a rear subframe (a suspension subframe) 44 that is fixed to the vehicle body 100.

This rear subframe 44 mainly includes: a right and left pair of side crossmembers 44a; a front crossmember 44b that extends in a manner to couple front end portions of these side crossmembers 44a in the vehicle width direction; and a rear crossmember 44c that extends in a manner to couple rear end portions of the side crossmembers 44a in the vehicle width direction. The center plane in the right-left direction of the vehicle body 100 is denoted by the reference sign CL in FIG. 9.

The rear suspension 3 in this embodiment is of the multi-link type that couples a wheel support (a wheel support member) 48 of a rear wheel assembly 46 to the vehicle body 100 by five independent I links 50, 52, 54, 56, 58 in a manner to allow a stroke of the wheel support (a wheel support member) 48. More specifically, the rear suspension 3 includes: a front upper link (an upper arm) 50 and a rear leading link (a leading arm) 52 that virtually constitute an upper arm; a front trailing link (a trailing arm) 54 and a rear lower link (a lower arm) 56 that virtually constitute a lower arm; and a toe control link (a toe control arm) 58 that regulates rotational displacement of the rear wheel assembly 46 around the virtual kingpin axis IK, which will be described below (see FIG. 12 and FIG. 13).

The upper link 50, the leading link 52, the trailing link 54, and the lower link 56 swing vertically about coupled sections (elastic bushes 70, 74, 82, 86), which will be described below. In this way, the wheel support 48 and the rear wheel assembly 46 stroke vertically along a specified trajectory. The wheel support 48 is a hub carrier that supports a hub 60, to which a wheel (not illustrated) of the rear wheel assembly 46 is attached.

In addition, the rear suspension 3 is provided with a shock absorber 66 that includes a coil spring 62 and a damper 64. The shock absorber 66 simultaneously applies a specified urging force and a specified damping force while allowing such a stroke of the rear wheel assembly 46. This shock absorber 66 has a cylindrical shape that is long in the vertical direction and in which the coil spring 62 and the damper 64 are arranged in the substantially coaxial manner. An upper end portion of the shock absorber 66 is attached to the vehicle body 100, and a lower end portion thereof (a lower end portion of the damper 64) is attached to the lower link 56 in the freely rotatable manner. An anti-roll bar 68 that extends to couple the right and left lower links 56 is rotatably attached to the rear suspension 3.

Figure 11:
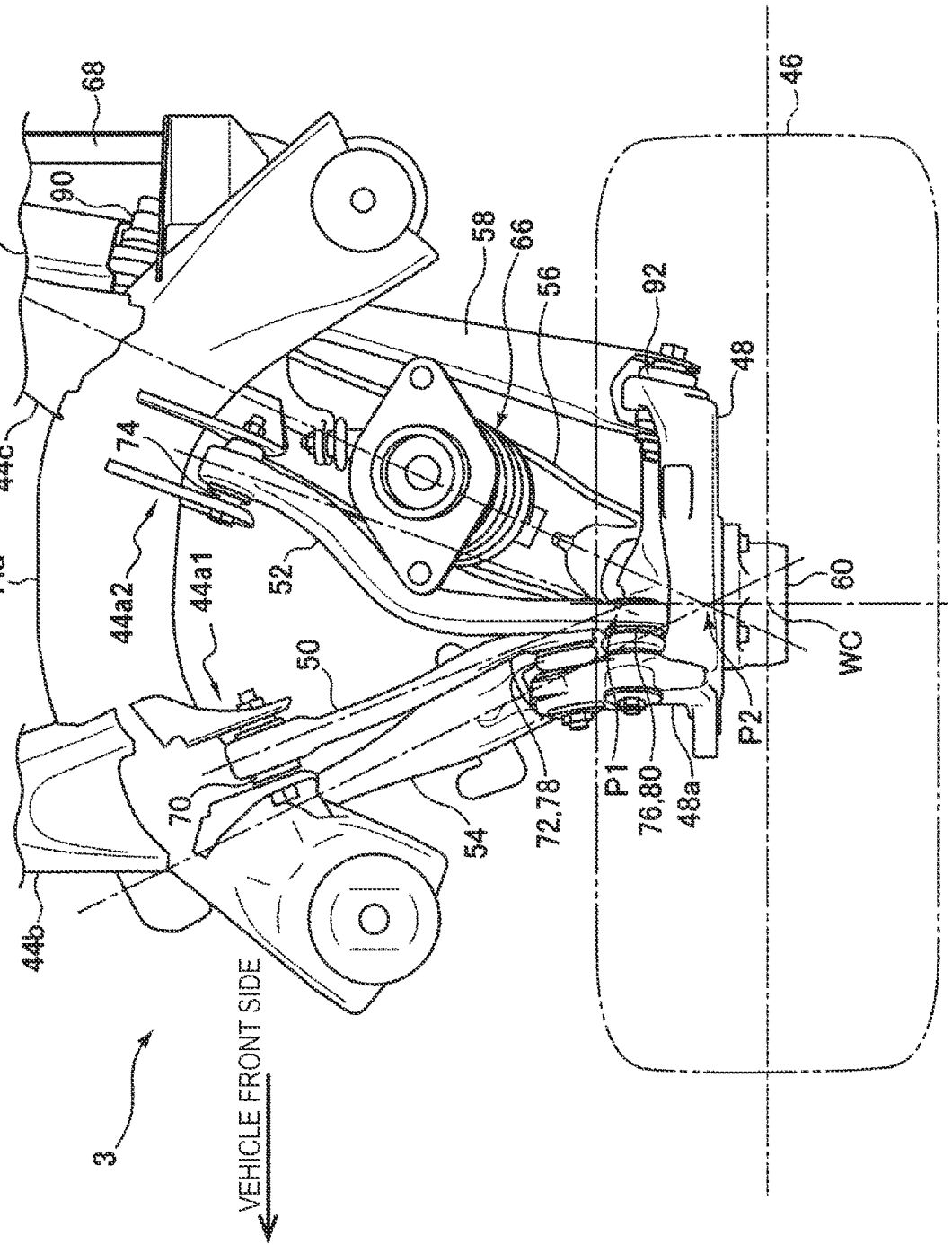
FIG. 11 is a top view of a rear suspension on a vehicle left side according to this embodiment.
Figure 12:
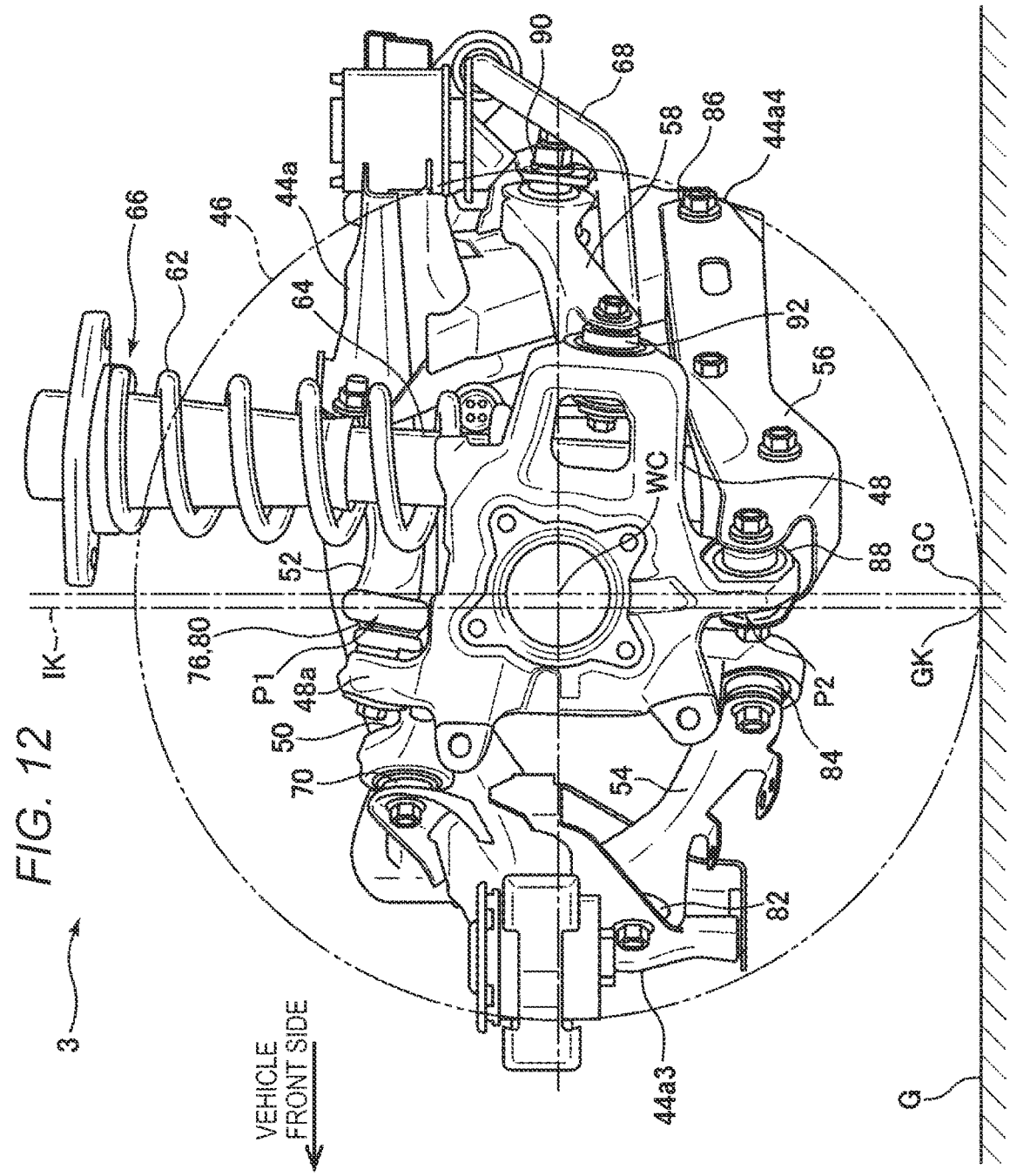
FIG. 12 is a side view of the rear suspension on the vehicle left side according to this embodiment.
Figure 13:
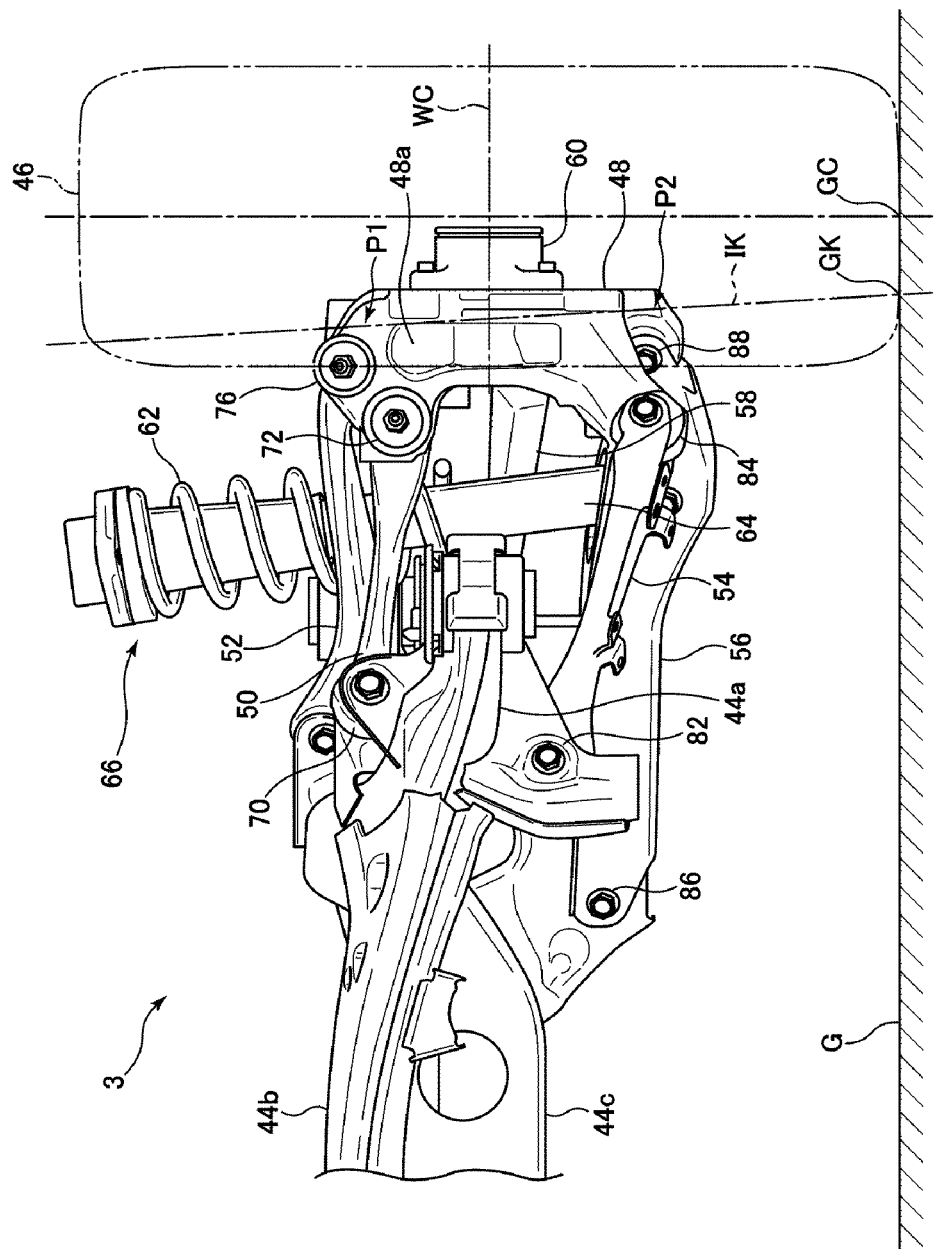
FIG. 13 is a front view of the rear suspension on the vehicle left side according to this embodiment.

Next, a specific description will be made on a configuration of the rear suspension 3 with reference to FIG. 11 to FIG. 13. FIG. 11 is a top view of the rear suspension on a vehicle left side according to this embodiment, FIG. 12 is a side view of the rear suspension on the vehicle left side according to this embodiment, and FIG. 13 is a front view of the rear suspension on the vehicle left side according to this embodiment. Here, since the rear suspension 3 on a right rear wheel side and the rear suspension 3 on a left rear wheel side have the same basic structure, a description herein will be centered on the rear suspension on the left rear wheel side.

First, as illustrated in FIG. 11 to FIG. 14, an inner end portion in the vehicle width direction of the upper link 50 is coupled to the side crossmember 44a via the elastic bush 70 that extends in the vehicle longitudinal direction (arranged to be tilted several degrees in plan view). When seen from a vehicle upper side, the upper link 50 gradually extends rearward from a third coupled section 44a1 of the side crossmember 44a on the vehicle body side toward the outer side in the vehicle width direction, and an outer end portion in the vehicle width direction of the upper link 50 is coupled to the wheel support 48 via a pivot section 72.

Next, an inner end portion in the vehicle width direction of the leading link 52 is coupled to the side crossmember 44a via the elastic bush 74 that extends in the vehicle longitudinal direction (arranged to be tilted several degrees in the plan view). When seen from the vehicle upper side, the leading link 52 gradually extends forward from a fourth coupled section 44a2 of the side crossmember 44a on the vehicle body side toward the outer side in the vehicle width direction, and an outer end portion in the vehicle width direction of the leading link 52 is coupled to the wheel support 48 via a pivot section 76.

Just as described, the two upper links 50, 52 are arranged to approach each other toward the outer side of the vehicle body 100 when seen from the vehicle upper side, and virtually form the upper arm. In this embodiment, ball joints (pillow ball joints) 78, 80, which will be described below, are respectively adopted as the pivot sections 72, 76 of the links 50, 52 in the wheel support 48.

Next, an inner end portion in the vehicle width direction of the trailing link 54 is coupled to the side crossmember 44a via the elastic bush 82 that extends in the vehicle longitudinal direction (arranged to be tilted several degrees in the plan view). When seen from the vehicle upper side, the trailing link 54 gradually extends rearward from a fifth coupled section 44a3 of the side crossmember 44a on the vehicle body side toward the outer side in the vehicle width direction, and an outer end portion in the vehicle width direction of the trailing link 54 is coupled to the wheel support 48 via an elastic bush 84 that extends in the vehicle longitudinal direction (arranged to be tilted several degrees in the plan view).

Next, an inner end portion in the vehicle width direction of the lower link 56 is coupled to the side crossmember 44a via an elastic bush 86 that extends in the vehicle longitudinal direction (arranged to be tilted several degrees in the plan view). When seen from the vehicle upper side, the lower link 56 gradually extends forward from a sixth coupled section 44a4 of the side crossmember 44a on the vehicle body side toward the outer side in the vehicle width direction, and an outer end portion in the vehicle width direction of the lower link 56 is coupled to the wheel support 48 via an elastic bush 88 that extends in the vehicle longitudinal direction (arranged to be tilted several degrees in the plan view).

Just as described, the two lower links 54, 56 are arranged to approach each other toward the outer side in the vehicle width direction when seen from the vehicle upper side, and virtually form the lower arm.

Next, an end portion on the vehicle body side of the toe control link 58 is coupled to a pivot section 90 on a rear surface of the rear crossmember 44c in a freely swingable manner in the vertical direction. When seen from the vehicle upper side, the toe control link 58 gradually extends forward from a seventh coupled section 44c1 of the rear crossmember 44c on the vehicle body side toward the outer side in the vehicle width direction, and an outer end portion in the vehicle width direction of the toe control link 58 is coupled to the wheel support 48 via an elastic bush 92.

Next, a description will be made of the main geometry of the rear suspension 3 according to the embodiment of the present disclosure with reference to FIG. 11 to FIG. 13. First, as illustrated in FIG. 11 to FIG. 13, the virtual kingpin axis IK is defined in the rear suspension 3. The virtual kingpin axis IK vertically connects an intersection point P1 between a virtual extension line of the upper link 50 and a virtual extension line of the leading link 52 and an intersection point P2 between a virtual extension line of the trailing link 54 and a virtual extension line of the lower link 56. This virtual kingpin axis IK is an instantaneous rotation center of rotation in a steering direction (a toe direction) of the rear wheel assembly 46. Here, a wheel center of the rear wheel assembly 46 is denoted by the reference sign WC in FIG. 11 to FIG. 13. In FIG. 11, an axis in the vehicle width direction of the rear wheel assembly 46 through the wheel center WC and a line indicating a vertical center plane of the rear wheel assembly 46 are each indicated by a one-dot chain line. In FIG. 12 and FIG. 13, a perpendicular axis and a horizontal axis, each of which extends through the wheel center WC, and which respectively divide the rear wheel assembly 46 into two in the longitudinal direction and the vertical direction, are each indicated by a one-dot chain line.

Next, as illustrated in FIG. 12, in the rear suspension 3 of this embodiment, geometries of the links 50, 52, 54, 56 are set such that, in the side view, the virtual kingpin axis IK extends substantially vertically at a position near and on a vehicle front side of the center of a tire contact patch GC of the rear wheel assembly 46. In this embodiment, the virtual kingpin axis IK extends such that the intersection point GK of the virtual kingpin axis IK with the ground G is located within a distance range of −120 mm to +120 mm from the center of a tire contact patch GC. A tilt angle of the virtual kingpin axis IK is an angle within a range of −2° to 0°. This tilt angle is positive (+) in a direction in which an upper portion of the virtual kingpin axis IK is tilted rearward in the side view. In this embodiment, the virtual kingpin axis IK only needs to be located between a position at which the virtual kingpin axis IK extends vertically at an angle of 0° and a position at which the upper portion of the virtual kingpin axis IK is tilted forward at an angle of −2°.

Next, as illustrated in FIG. 12, in this embodiment, the coil spring 62 and the damper 64 are arranged coaxially, so as to concentrate a load received by the shock absorber 66. Furthermore, in this embodiment, the wheel center WC as a load input point from the rear wheel assembly 46 and the pivot section (the elastic bush) 88 as a load support point of the lower link (the lower arm) 56 that mainly receives a lateral force from the rear wheel assembly 46 are aligned on the vertical line, that is, an offset amount in the vehicle longitudinal direction between the load input point from the rear wheel assembly 46 and the load support point of the lower link 56 that receives the load is set to 0 (zero), so as to set an internal force to 0 (zero). In this way, an alignment change of the rear suspension 3 is prevented against an external force input from the rear wheel assembly 46.

Figure 14:
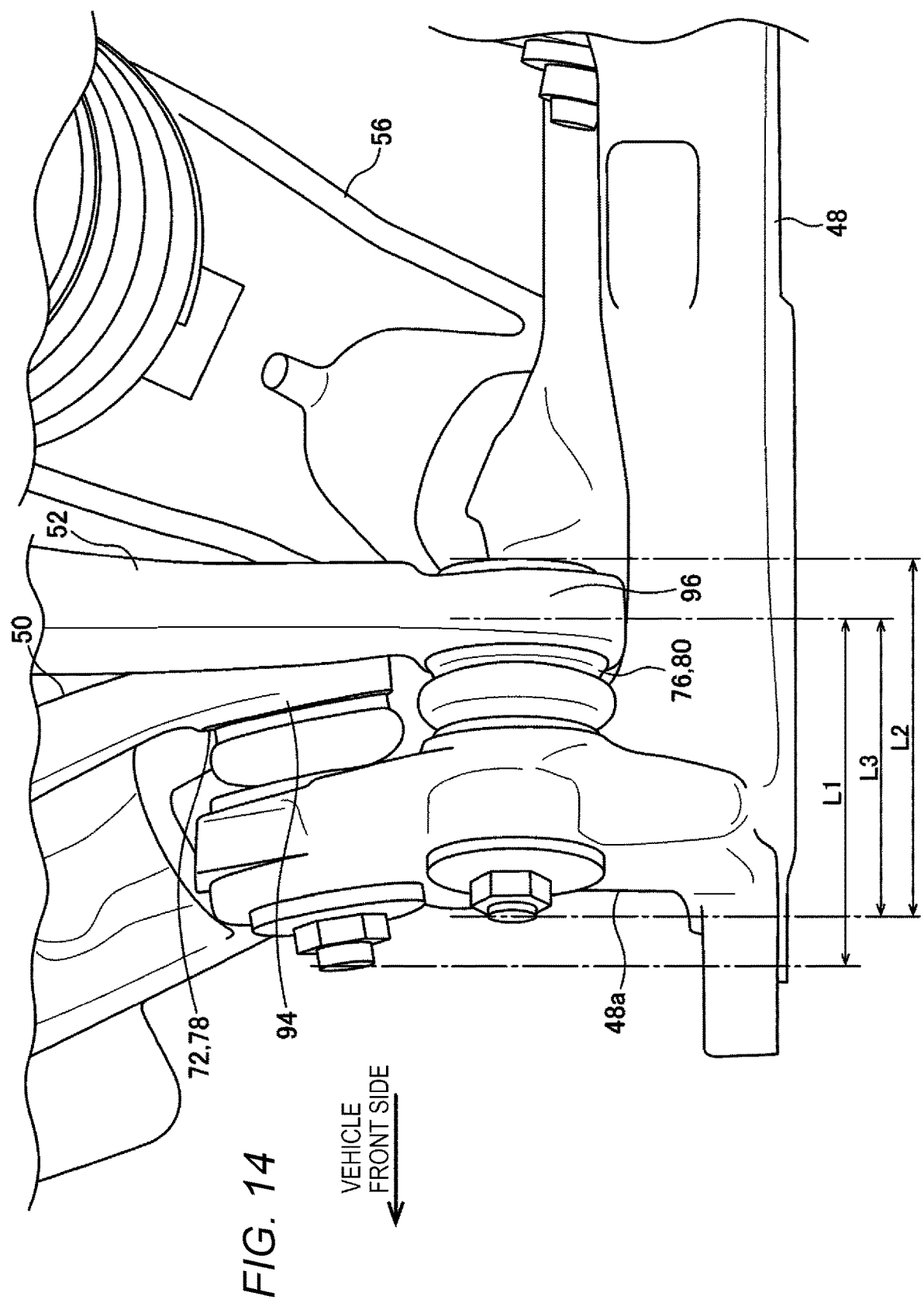
FIG. 14 is a top view for explaining a positional relationship between pivot sections of an upper link and a trailing link in a wheel support of the rear suspension according to this embodiment.
Figure 15:
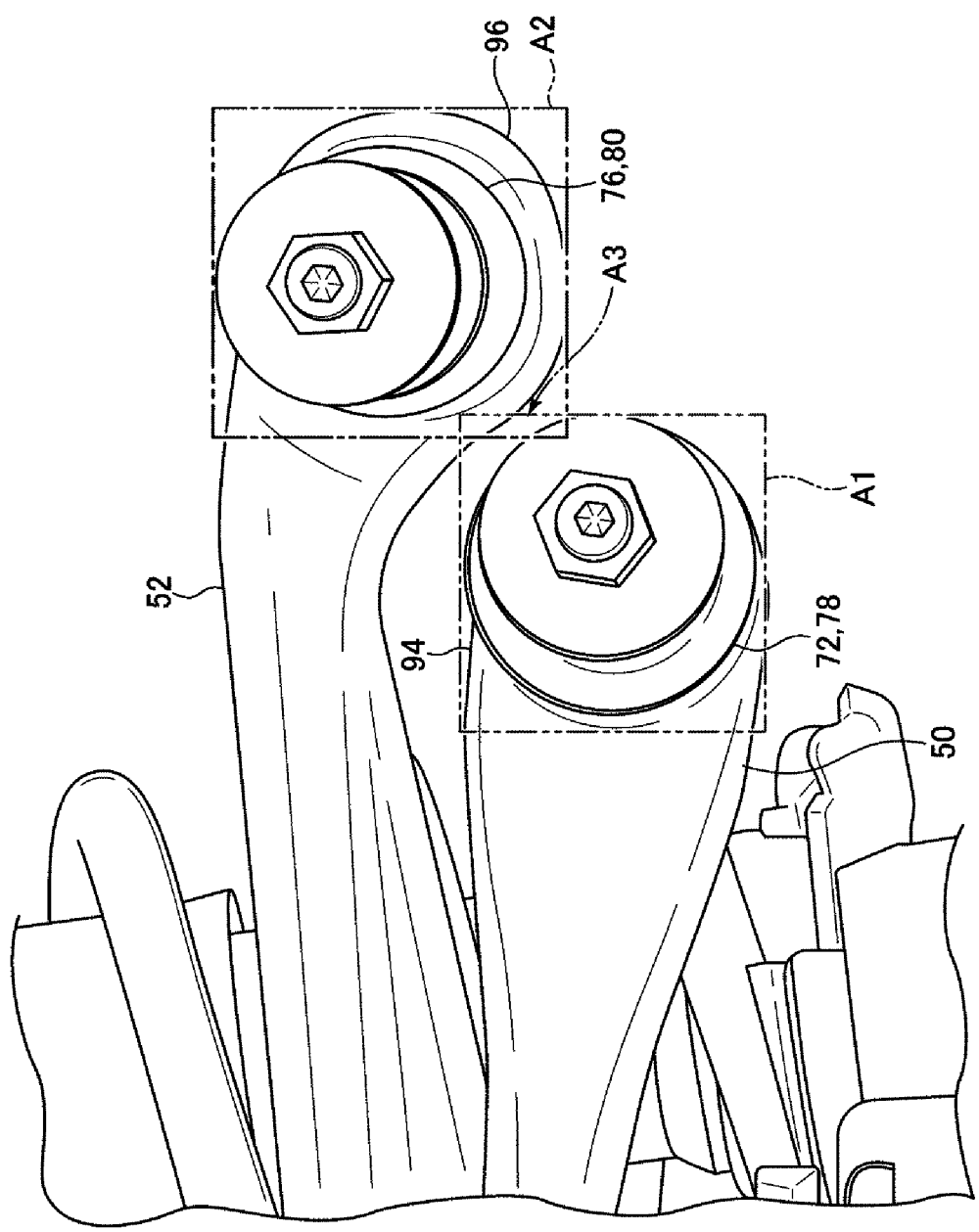
FIG. 15 is a front view for explaining the positional relationship between the pivot sections of the upper link and the trailing link in the wheel support of the rear suspension according to this embodiment and is a view in which the wheel support is not illustrated.

Next, a description will be made of configurations of the pivot sections 72, 76 of the upper link 50 and the leading link 52 in the embodiment of the present disclosure with reference to FIG. 11 to FIG. 15. FIG. 14 is a top view for explaining a positional relationship between the pivot sections of the upper link and the trailing link in the wheel support of the rear suspension in this embodiment, and FIG. 15 is a front view for explaining the positional relationship between the pivot sections of the upper link and the trailing link in the wheel support of the rear suspension in this embodiment and is a view in which the wheel support is not illustrated.

First, as illustrated in FIG. 11 to FIG. 14, ball sections (not illustrated), pillow ball housings 94, 96, and the pillow ball joints 78, 80 are respectively provided in the outer end portions in the vehicle width direction of the upper link 50 and the leading link 52. Each of the ball sections (not illustrated) is arranged to be freely rotatable about three axes (X, Y, Z) in the respective end portion. Each of the pillow ball housings 94, 96 holds this ball section. Each of the pillow ball joints 78, 80 has a shaft section (not illustrated) that extends to the vehicle front side from the ball section.

In this embodiment, each of the pillow ball housings 94, 96 is a portion that has a specified thickness (15 mm in this embodiment), has a circular (annular) cross section, and surrounds the respective ball section. In this embodiment, the pillow ball housings 94, 96 are respectively formed by the outer end portions in the vehicle width direction of the upper link 50 and the leading link 52. In addition, a tip portion of the shaft section (not illustrated) extending from the ball section is fastened to a front wall section 48a of the wheel support 12, and the front wall section 48a is formed in front of the wheel center WC. In this embodiment, the pivot sections 72, 76 are respectively formed by the thus-configured pillow ball joints 78, 80.

Next, in this embodiment, as illustrated in FIG. 11 to FIG. 15, the pivot section 72 of the upper link 50 and the pivot section 76 of the leading link 52 are arranged adjacent to each other at positions on the vehicle front side of the wheel center WC of the rear wheel assembly 46. In further detail, for example, as illustrated in FIG. 14, the pivot sections 72, 76 (the pillow ball joints 78, 80) have specified lengths (denoted by reference signs L1, L2) in the vehicle longitudinal direction. In this embodiment, in the top view and the side view, the pivot sections 72, 76 overlap each other in the vehicle longitudinal direction, and this overlapping area is denoted by a reference sign L3 in FIG. 14.

For example, in FIG. 15, a formation area A1 of the pivot section 72 in the upper link 50 that is seen from the vehicle front side is indicated by a virtual line, and a formation area A2 of the pivot section 76 in the leading link 52 is indicated by a virtual line. In this embodiment, the pivot section 72 (the pillow ball joint 78) of the upper link 50 and the pivot section 76 (the pillow ball joint 80) of the leading link 52 are arranged to overlap each other in the vehicle vertical direction and the vehicle width direction in the front view. In detail, in FIG. 15, as illustrated in an overlapping area A3, the formation area A1 of the pivot section 72 and the formation area A2 of the pivot section 76 overlap each other in the vehicle vertical direction and the vehicle width direction.

In addition, in this embodiment, as illustrated in FIG. 13, in the front view and the rear view, the pivot section 72 is arranged adjacent to the pivot section 76, on a lower side in the vehicle vertical direction and on the inner side in the vehicle width direction of the pivot section 76, and at an angular position of approximately 45 degrees with respect to the pivot section 76.

Next, a description will be made on action of vehicle behavior that is obtained by a travel test performed using a test vehicle on which the vehicle suspension system 1 according to the embodiment of the present disclosure is mounted with reference to FIG. 16. FIG. 16 is a line diagram for explaining an example of vehicle motion at an initial steering stage that is obtained by the test of the vehicle on which the vehicle suspension system according to the embodiment of the present disclosure is mounted. A vertical axis of FIG. 16 represents values such as a steering wheel angle, and a horizontal axis thereof indicates a time since the driver starts steering during travel.

In a time chart illustrated in FIG. 16, after the start of steering (0 second), the steering wheel angle is first changed, and then yaw motion of the vehicle occurs at an early stage. Thereafter, at specified timing, lateral acceleration occurs, and a roll angle of the vehicle body 100 is changed almost at the same time. Although not indicated on a time scale in FIG. 16, the test shows that the roll angle, which occurs at the specified timing, is thereafter increased linearly. As illustrated in FIG. 16, generation of the roll by the "kinematic roll" is prevented. In other words, in a period from the start of steering to the time at which the roll angle of the vehicle body 100 occurs, the roll angle is kept to a minimum value that does not affect the vehicle behavior and the driver's driving sensation.

Conventionally, when the driver steers a steering wheel as described above, the "kinematic roll" occurs at first, the yaw occurs next, and the roll then occurs due to the lateral acceleration during the turn. Thus, vehicle posture is changed in a complicated manner by steering, which hinders a smooth change of the vehicle posture. However, it is confirmed that, in the vehicle on which the vehicle suspension system 1 having the above-described geometry according to this embodiment is mounted, as illustrated in the example in FIG. 16, the kinematic roll at the initial turning stage is minimized, and the vehicle posture is smoothly changed with respect to a steering force and the steering angle.

A method for designing the vehicle suspension system in this embodiment may include: a step of setting the caster angle ti within the range of +3° to +5°; a step of setting the caster trail T within the range of +20 to +30 mm; a step of setting the intersection point GK between the ground G and the extension line of the kingpin axis K or the virtual kingpin axis IK to be located on the inner side in the vehicle width direction of the center of a tire contact patch GC; a step of setting the anhedral angle α of the lower arm, which couples the vehicle body 100 and the wheel support 12, within the range of +2.8° to +7.2°; a step of determining the arrangement of each of the arms, each of the links, each of the pivot sections, and/or the damper in the front suspension, so as to be able to obtain the numerical values, the arrangement, and the kingpin axis K or the virtual kingpin axis IK set in these steps; a step of setting the virtual kingpin axis IK to extend near the center of a tire contact patch GC of the rear wheel; a step of setting the virtual kingpin axis IK to extend vertically at the angle within the range of −2° to 0°; and a step of determining the arrangement of the five links and the arrangement of each of the pivot sections so as to obtain the virtual kingpin axis IK set in these steps. In addition, the above-described equation "T=r×sin(τ)+Th . . . Equation (1)" may be used for such a design method.

Although not illustrated, an automobile (the vehicle) in this embodiment is a rear-wheel drive vehicle in which the front wheel assembly 6 is steered by using the steering system, in which an engine is mounted in an engine compartment in a front portion of the vehicle body 100, and in which a differential is arranged in a rear portion of the vehicle body 100 to drive the rear wheel assembly 46 with an axle. However, this embodiment may be applied to a front-wheel drive vehicle.

The present disclosure is not limited to the configuration in the above-described embodiment, and includes various other configurations. For example, in order to improve steering stability, the leading link 52, the lower link 56, or the like may be coupled to the wheel support 48 via a ball joint. In addition, the elastic bush is not limited to the rubber bush and may be a resinous bush having required elasticity.

Next, a description will be made on operational effects of the vehicle suspension system according to this embodiment and the modified example thereof. The vehicle suspension system 1 according to this embodiment and the modified example includes: the front suspension 2 that suspends the front wheel assembly 6; and the rear suspension 3 that suspends the rear wheel assembly 46. The front suspension 2 has a geometry such that the caster angle ti defined by the kingpin axis K or the virtual kingpin axis IK falls within the range of +3° to +5° in the side view, that the caster trail T defined by the center of a tire contact patch GC and the kingpin axis K or the virtual kingpin axis IK falls within the range of +20 to +30 mm in the side view, that the intersection point GK between the ground G and the extension line of the kingpin axis K or the virtual kingpin axis IK is located on the inner side in the vehicle width direction of the center of a tire contact patch GC in the front view, and that the anhedral angle α of the lower arm 10, which couples the vehicle body 100 and the wheel support 12, falls within the range of +2.8° to +7.2° in the front view. The rear suspension 3 includes the five links 50, 52, 54, 56, 58 that couple the vehicle body 100 and the wheel support 48, and has a geometry such that the virtual kingpin axis IK extends near the center of a tire contact patch GC of the rear wheel assembly 46 and vertically extends at the angle within the range of −2° to 0°.

According to the thus-configured embodiment and modified example, the kinematic roll at the initial turning stage can be minimized by each of the geometries of the front suspension 2 and the rear suspension 3. In this way, the vehicle posture can be changed smoothly by the roll posture caused by a centrifugal force during a steady turn while the roll caused by the steering force and the steer angle is prevented at the initial turning stage. In other words, for example, in the vehicle behavior about the three axes of the vehicle, after the generation of the tire lateral force and the generation of the pitch associated therewith, roll motion can be caused in addition to the lateral acceleration applied to the vehicle.

Here, the vehicle body 100 is basically rigid. Thus, in the case where the virtual kingpin axis IK at the rear does not extend substantially vertically and near the center of a tire contact patch GC unlike this embodiment, the rear suspension 3 tends to be subjected to roll steer as being affected by the roll of the entire vehicle body. Meanwhile, the rear suspension 3 of this embodiment has the geometry satisfying that the virtual kingpin axis IK extends near the center of a tire contact patch GC of the rear wheel assembly 46 and extends vertically at the angle within the range of −2° to 0°. Thus, a roll steer tendency is prevented. In addition, the "kinematic roll" in front is also prevented by preventing the roll of the entire vehicle body.

As it has been described so far, according to this embodiment, it is possible to minimize the "kinematic roll", which causes the vehicle body to roll during steering of the steering wheel, at the initial turning stage, so as to prevent roll at the initial turning stage. When the turn becomes steady, the roll posture is caused by centrifugal force, allowing the driver to feel a smooth turn. As a result, the driver can effectively obtain the sensation of maneuvering the vehicle well.

Here, it is ideal for the driver that the steering angle is changed when the steering force is applied (when the driver feels "response"). In such a case, the vehicle behavior matches the driver's steering sensation. Such matching is possible by adjusting a "dead zone" of steering appropriately. In this way, the above-described operational effects of this embodiment can be obtained further effectively.

According to this embodiment, the front suspension 2 is a double wishbone type suspension that includes: the wheel support 12 that supports the front wheel assembly 6 in the freely rotatable manner; the upper arm 8 that extends in the vehicle width direction from the coupled section on the vehicle body side and is coupled to the wheel support 12 via the pivot section 36 on the vehicle upper side of the wheel center WC of the front wheel assembly 6; and the lower arm 10 that extends in the vehicle width direction from the coupled section on the vehicle body side and is coupled to the wheel support 12 via the pivot section 38 on the vehicle lower side of the wheel center WC of the front wheel assembly 6. In the front suspension 2, the kingpin axis K is defined by the line connecting the pivot section 36 of the upper arm 8 and the pivot section 38 of the lower arm 10.

According to the thus-configured present disclosure, in the front suspension 2 of the double wishbone type, the kinematic roll at the initial turning stage can be minimized while suspension support rigidity is secured effectively. In this way, the vehicle posture can be changed smoothly by the roll posture caused by the centrifugal force during a steady turn while the roll caused by the steering force and the steering angle is prevented at the initial turning stage.

In addition, according to the modified example of this embodiment, the front suspension is a strut-type suspension that includes: the wheel support 12 that supports the front wheel in the freely rotatable manner; the damper that couples the vehicle body and the wheel support member; and the lower arm that extends in the vehicle width direction from the coupled section on the vehicle body side and is coupled to the wheel support member via the pivot section. In the strut-type suspension, the kingpin axis K is defined by the line connecting the attachment section of the damper to the vehicle body and the pivot section of the lower arm. Alternatively, the front suspension is a multi-link type suspension that includes: the wheel support member that supports the front wheel in the freely rotatable manner; and the five links that couple the front wheel and the wheel support member. In the multi-link type suspension, the virtual kingpin axis IK is defined by the upper link, the leading link, the trailing link, and the lower link (the lower arm) of the five links.

According to the thus-configured modified example of this embodiment, in the strut-type front suspension or the multi-link type front suspension, the kinematic roll at the initial turning stage of the suspension can be minimized. In this way, the vehicle posture can be changed smoothly by the roll posture caused by the centrifugal force during a steady turn while the roll caused by the steering force and the steering angle is prevented at the initial turning stage.

According to this embodiment and the modified example, the rear suspension 3 includes: the wheel support 48 that supports the rear wheel assembly 46 in the freely rotatable manner; the upper link 50 that extends to the vehicle rear side of the coupled section on the vehicle body side and, on the vehicle upper side of the wheel center WC of the rear wheel assembly 46, is coupled to the wheel support 48 via the pivot section 72; the leading link 52 that extends to the vehicle front side of the coupled section on the vehicle body side and, on the vehicle upper side of the wheel center WC of the rear wheel assembly 46, is coupled to the wheel support 48 via the pivot section 76; the trailing link 54 that extends to the vehicle rear side of the coupled section on the vehicle body side and, on the vehicle lower side of the wheel center WC of the rear wheel assembly 46, is coupled to the wheel support 48 via the pivot section (the elastic bush 84); the lower link (the lower arm) 56 that extends to the vehicle front side of the coupled section on the vehicle body side and, on the vehicle lower side of the wheel center WC of the rear wheel assembly 46, is coupled to the wheel support 48 via the pivot section (the elastic bush 88); and the toe control link 58 that extends in the vehicle width direction from the coupled section on the vehicle body side and is coupled to the wheel support 48 via the pivot section (the elastic bush 92). In the rear suspension 3, the virtual kingpin axis IK is defined by connecting the intersection point P1 on the virtual extension line of each of the upper link 50 and the leading link 52 and the intersection point P2 on the virtual extension line of each of the trailing link 54 and the lower link 56, and the pivot section 72 (the pillow ball joint 78) of the upper link 50 and the pivot section 76 (the pillow ball joint 80) of the leading link 52 are arranged adjacent to each other at positions on the vehicle front side of the wheel center WC of the rear wheel assembly 46.

According to the thus-configured embodiment and modified example, it is possible to further reliably minimize the kinematic roll at the initial turning stage by preventing displacement of the virtual kingpin axis IK in the rear suspension 3 during the turn.

According to this embodiment and the modified example, in the rear suspension 3, the pivot section 72 (the pillow ball joint 78) of the upper link 50 and the pivot section 76 (the pillow ball joint 80) of the leading link 52 are arranged to overlap in the vehicle longitudinal direction in the plan view and overlap in the vehicle vertical direction and the vehicle width direction in the front view. Therefore, the pivot section 72 (the pillow ball joint 78) of the upper link 50 and the pivot section 76 (the pillow ball joint 80) of the leading link 52 can further be reliably arranged adjacent to each other.

What is claimed is:

1. A vehicle suspension system comprising:
 a front suspension that suspends a front wheel; and
 a rear suspension that suspends a rear wheel, wherein
 the front wheel and the front suspension are configured such that
  a caster angle defined by one of a kingpin axis and a virtual kingpin axis falls within a range of +3 degrees to +5 degrees in a side view,
  a caster trail defined by a center of a tire contact patch and one of the kingpin axis and the virtual kingpin axis falls within a range of +20 to +30 mm in the side view,
  an intersection point between a ground and an extension line of the kingpin axis or the virtual kingpin axis is located on an inner side in a vehicle width direction of the center of a tire contact patch in a front view, and
  a lower arm coupling a vehicle body and a wheel support member is provided, and an anhedral angle of the lower arm falls within a range of +2.8 degrees to +7.2 degrees in the front view further based on a vehicle weight on the front suspension, and
 the rear suspension includes five links that couple the vehicle body and a wheel support member, and the rear suspension and the rear wheel are configured such that a virtual kingpin axis extends near the center of a tire contact patch of the rear wheel and extends vertically at an angle within a range of −2 degrees to 0 degrees.

2. The vehicle suspension system according to claim 1, wherein
 the front suspension is a double wishbone type suspension that includes an upper arm that extends in the vehicle width direction from a first coupled section on the vehicle body side and, on a vehicle upper side of a wheel center of the front wheel, is coupled to the wheel support member via a pivot section;
 the wheel support member supports the front wheel in a freely rotatable manner;
 the lower arm extends in the vehicle width direction from a second coupled section on the vehicle body side and, on a vehicle lower side of the wheel center of the front wheel, is coupled to the wheel support member via a pivot section, and
 the kingpin axis is defined by a line that connects the pivot section of the upper arm and the pivot section of the lower arm.

3. The vehicle suspension system according to claim 2, wherein
 the rear suspension includes:
  an upper link that extends to a vehicle rear side from a third coupled section on the vehicle body side and, on the vehicle upper side of a wheel center of the rear wheel, is coupled to the wheel support member via a pivot section;
  a leading link that extends to a vehicle front side from a fourth coupled section on the vehicle body side and, on the vehicle upper side of the wheel center of the rear wheel, is coupled to the wheel support member via a pivot section;
  a trailing link that extends to the vehicle rear side from a fifth coupled section on the vehicle body side and, on a vehicle lower side of the wheel center of the rear wheel, is coupled to the wheel support member via a pivot section;
  a lower link that extends to the vehicle front side from a sixth coupled section on the vehicle body side and, on the vehicle lower side of the wheel center of the rear wheel, is coupled to the wheel support member via a pivot section; and
  a toe control link that extends in the vehicle width direction from a seventh coupled section on the vehicle body side and is coupled to the wheel support member via a pivot section;
 the wheel support member supports the rear wheel in the freely rotatable manner;
 the virtual kingpin axis is defined by vertically connecting an intersection point on a virtual extension line of each of the upper link and the leading link and an intersection point on a virtual extension line of each of the trailing link and the lower link, and
 the pivot section of the upper link and the pivot section of the leading link are arranged adjacent to each other at positions on the vehicle front side of the wheel center of the rear wheel.

4. The vehicle suspension system according to claim 1, wherein
 the rear suspension includes:
  an upper link that extends to a vehicle rear side from a third coupled section on the vehicle body side and, on the vehicle upper side of a wheel center of the rear wheel, is coupled to the wheel support member via a pivot section;
  a leading link that extends to a vehicle front side from a fourth coupled section on the vehicle body side and, on the vehicle upper side of the wheel center of the rear wheel, is coupled to the wheel support member via a pivot section;

a trailing link that extends to the vehicle rear side from a fifth coupled section on the vehicle body side and, on a vehicle lower side of the wheel center of the rear wheel, is coupled to the wheel support member via a pivot section;

a lower link that extends to the vehicle front side from a sixth coupled section on the vehicle body side and, on the vehicle lower side of the wheel center of the rear wheel, is coupled to the wheel support member via a pivot section; and a toe control link that extends in the vehicle width direction from a seventh coupled section on the vehicle body side and is coupled to the wheel support member via a pivot section;

the wheel support member supports the rear wheel in a freely rotatable manner;

the virtual kingpin axis is defined by vertically connecting an intersection point on a virtual extension line of each of the upper link and the leading link and an intersection point on a virtual extension line of each of the trailing link and the lower link, and the pivot section of the upper link and the pivot section of the leading link are arranged adjacent to each other at positions on the vehicle front side of the wheel center of the rear wheel.

5. The vehicle suspension system according to claim 4, wherein in the rear suspension, the pivot section of the upper link and the pivot section of the leading link are arranged to overlap each other in a vehicle longitudinal direction in a plan view and to overlap each other in a vehicle vertical direction and the vehicle width direction in a front view.

\* \* \* \* \*